US010279955B2

(12) United States Patent
Bradley et al.

(10) Patent No.: US 10,279,955 B2
(45) Date of Patent: May 7, 2019

(54) MODULAR DECK SYSTEM FOR USE WITH MOVABLE PLATFORMS

(71) Applicant: Innovative Logistics, Inc., Fort Smith, AR (US)

(72) Inventors: Mark Bradley, Fort Smith, AR (US); Patrick Sullivan, Fort Smith, AR (US); Shannon Lively, Fort Smith, AR (US); Seth Galewyrick, Fort Smith, AR (US); Stonie Hopkins, Fort Smith, AR (US); Dylan Henderson, Fort Smith, AR (US); Brad Blackstone, Fort Smith, AR (US)

(73) Assignee: INNOVATIVE LOGISTICS, INC., Fort Smith, AR (US)

( * ) Notice: Subject to any disclaimer, the term of this patent is extended or adjusted under 35 U.S.C. 154(b) by 0 days.

(21) Appl. No.: 15/798,597

(22) Filed: Oct. 31, 2017

(65) Prior Publication Data
US 2018/0118408 A1    May 3, 2018

Related U.S. Application Data

(60) Provisional application No. 62/414,967, filed on Oct. 31, 2016, provisional application No. 62/510,032, filed on May 23, 2017.

(51) Int. Cl.
*B65D 19/06* (2006.01)
*B65D 19/38* (2006.01)
(Continued)

(52) U.S. Cl.
CPC ........... *B65D 19/385* (2013.01); *B65D 19/06* (2013.01); *E04H 6/00* (2013.01); *E04H 6/06* (2013.01);
(Continued)

(58) Field of Classification Search
CPC .................. B65D 19/385; B65D 19/06; B65D 2519/00273; B65D 2519/00532;
(Continued)

(56) References Cited

U.S. PATENT DOCUMENTS 2,678,139 A      5/1954  Gildersleeve
3,459,326 A  *  8/1969  Betjemann ........... B65D 88/005
                                                       217/43 R
(Continued)

FOREIGN PATENT DOCUMENTS

CA        2144886 A1    9/1996
CN       203520452      4/2014
(Continued)

OTHER PUBLICATIONS

H&M Bay Deploys RFID solution at cross-docketing distribution center, RFID24-7Com, Mar. 30, 2010.
(Continued)

*Primary Examiner* — Stephen T Gordon
(74) *Attorney, Agent, or Firm* — Katten Muchin Rosenman LLP

(57) ABSTRACT

Disclosed herein is a modular deck system that utilizes a combination of a movable platform having a plurality of vertical posts with engagement members. Decks, filled with freight, can be placed onto the vertical posts at various heights at different sections of the movable platform using a conveyance vehicle. Further, the height of the vertical posts can be extended using an extension post for securing tall cargo. The decks can also be locked to the vertical posts to prevent dislodgement of the deck during transport of the movable platform.

19 Claims, 31 Drawing Sheets

(51) Int. Cl.
*E04H 6/00* (2006.01)
*E04H 6/06* (2006.01)
*E04H 6/10* (2006.01)
*B60P 3/08* (2006.01)
*B62D 33/02* (2006.01)
*B62D 33/08* (2006.01)

(52) U.S. Cl.
CPC .................. *E04H 6/10* (2013.01); *B60P 3/08* (2013.01); *B62D 33/0207* (2013.01); *B62D 33/08* (2013.01); *B65D 2519/0097* (2013.01); *B65D 2519/00273* (2013.01); *B65D 2519/00532* (2013.01); *B65D 2519/00572* (2013.01); *B65D 2519/00577* (2013.01); *B65D 2519/00671* (2013.01)

(58) Field of Classification Search
CPC ........... B65D 2519/00572; B65D 2519/00577; B65D 2519/00671; B65D 2519/0097; E04H 6/00; E04H 6/06; E04H 6/10; B60P 3/08; B62D 33/08; B62D 33/0207
USPC ......... 410/4, 24, 26; 105/370, 375; 414/495; 108/54.1, 56.1, 147.21; 211/187, 191, 211/192, 208
See application file for complete search history.

(56) References Cited

U.S. PATENT DOCUMENTS

| | | |
|---|---|---|
| 3,561,608 A | 2/1971 | Weider |
| 3,667,635 A | 6/1972 | Hackney |
| 3,695,456 A | 10/1972 | Lewis |
| 3,938,678 A | 2/1976 | Kern |
| 4,231,695 A | 11/1980 | Weston, Sr. |
| 5,011,358 A | 4/1991 | Anderson et al. |
| 5,344,266 A * | 9/1994 | Kolb .................. B60P 3/08 410/145 |
| 5,454,672 A | 10/1995 | Halpin et al. |
| 5,799,585 A | 9/1998 | Brennan, Jr. et al. |
| 6,062,780 A * | 5/2000 | Petelka .................. B60P 1/00 410/143 |
| 6,106,186 A | 8/2000 | Taipale et al. |
| 6,529,797 B2 | 3/2003 | Williams et al. |
| 6,575,686 B2 | 6/2003 | Hagenzieker |
| 6,669,089 B2 | 12/2003 | Cybulski et al. |
| 6,698,655 B2 | 3/2004 | Kondo et al. |
| 7,030,760 B1 | 4/2006 | Brown |
| 7,101,139 B1 | 9/2006 | Benedict |
| 7,327,262 B2 | 2/2008 | Motteram et al. |
| 7,603,299 B1 | 10/2009 | Dewey, Jr. et al. |
| 7,739,147 B2 | 6/2010 | Branigan et al. |
| 7,742,745 B2 | 6/2010 | Twitchell, Jr. |
| 7,826,920 B2 | 11/2010 | Stevens et al. |
| 7,918,631 B2 * | 4/2011 | Overbye ................ B65D 85/68 410/24 |
| 7,991,505 B2 | 8/2011 | Lert, Jr. et al. |
| 8,442,879 B2 | 5/2013 | Dewey, Jr. et al. |
| 8,491,240 B2 | 7/2013 | Baker |
| 8,626,540 B2 | 1/2014 | Peterkofsky et al. |
| 8,731,708 B2 | 5/2014 | Shakes et al. |
| 8,744,884 B2 | 6/2014 | Benda et al. |
| 8,972,045 B1 | 3/2015 | Mountz et al. |
| 9,367,827 B1 | 6/2016 | Lively et al. |
| 2005/0071234 A1 | 3/2005 | Schon |
| 2006/0015532 A1 | 1/2006 | Mizell |
| 2007/0136079 A1 | 6/2007 | Beykirch et al. |
| 2007/0156491 A1 | 7/2007 | Schuler et al. |
| 2007/0174148 A1 | 7/2007 | Schuler et al. |
| 2007/0279224 A1 | 12/2007 | Branigan |
| 2008/0103944 A1 | 5/2008 | Hagemann et al. |
| 2008/0167817 A1 | 7/2008 | Hessler et al. |
| 2009/0267770 A1 | 10/2009 | Twitchell, Jr. |
| 2010/0108760 A1 | 5/2010 | Eccleston |
| 2011/0274523 A1 | 11/2011 | Petalas |
| 2012/0101956 A1 | 4/2012 | Hyre et al. |
| 2012/0112904 A1 | 5/2012 | Nagy |
| 2012/0191272 A1 | 7/2012 | Andersen et al. |
| 2014/0277691 A1 | 9/2014 | Jacobus et al. |

FOREIGN PATENT DOCUMENTS

| | | |
|---|---|---|
| DE | 2951271 A1 | 7/1981 |
| EP | 2 845 823 A1 | 3/2015 |
| JP | 07-069458 A | 3/1995 |
| KR | 10-2014-0101117 A | 8/2014 |
| WO | 2016/170555 A1 | 10/2016 |

OTHER PUBLICATIONS

3PL Adds Customer Value with RFID, Sato Eueope, Megatrux, Inc., Rancho Cucamonga, California.

"Maida Napolitano", Contributing editor, Crossdocking: The latest and greatest, Article from Logistics Management, MMH Editorial, Apr. 1, 2010.

K. Choy, et. al., Cross-dock job assignment problem in space-constrained industrial logistics distribution hubs with a single docking zone, Taylor & Francis Online, International Journal of Production Research, vol. 50, Issue 9, 2012, Special Issue: International logistics systems: theory and applications.

G. Miragliotta, et. al., A quantitative model for the introduction of RFId in the fast moving consumer goods supply chain: Are there any profits?, International Journal of Operations & Production Management, ISSN: 0144-3577, Online from 1980, Subject Area: Management Science & Operations.

J Wang, et. al., Real-time trailer scheduling for crossdock operations, Transportation Journal 47.2, (Apr. 2008-Jun. 2008): 5(16).

Transmittal; International Search Report; and the Written Opinion of the International Searching Authority for International Application No. PCT/US2015/065775 dated Mar. 30, 2016.

Transmittal; International Search Report; Written Opinion of the International Searching Authority for International Application No. PCT/US2017/059113 dated Jun. 4, 2018.

* cited by examiner

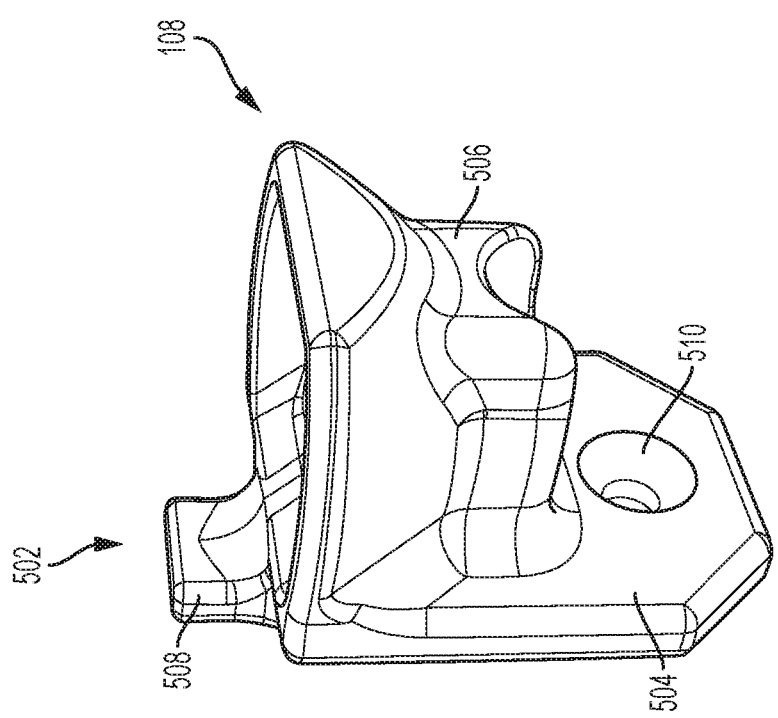

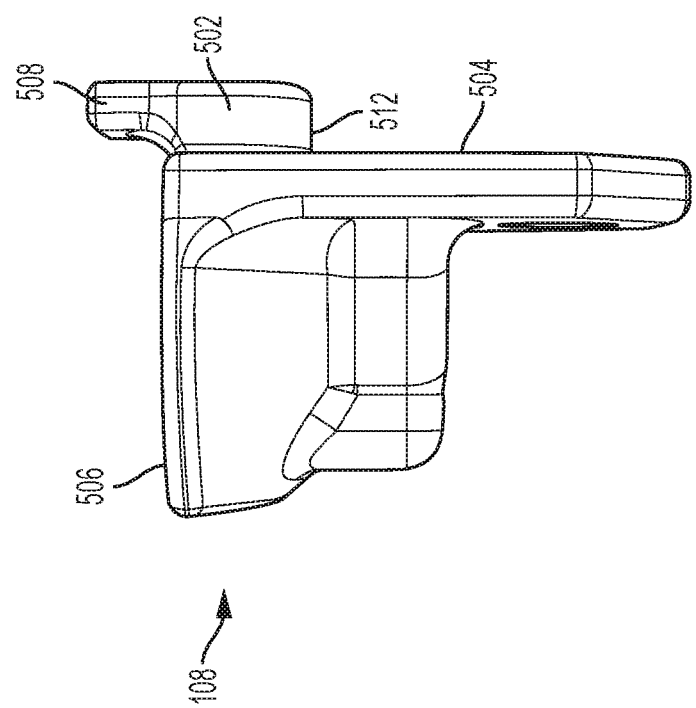

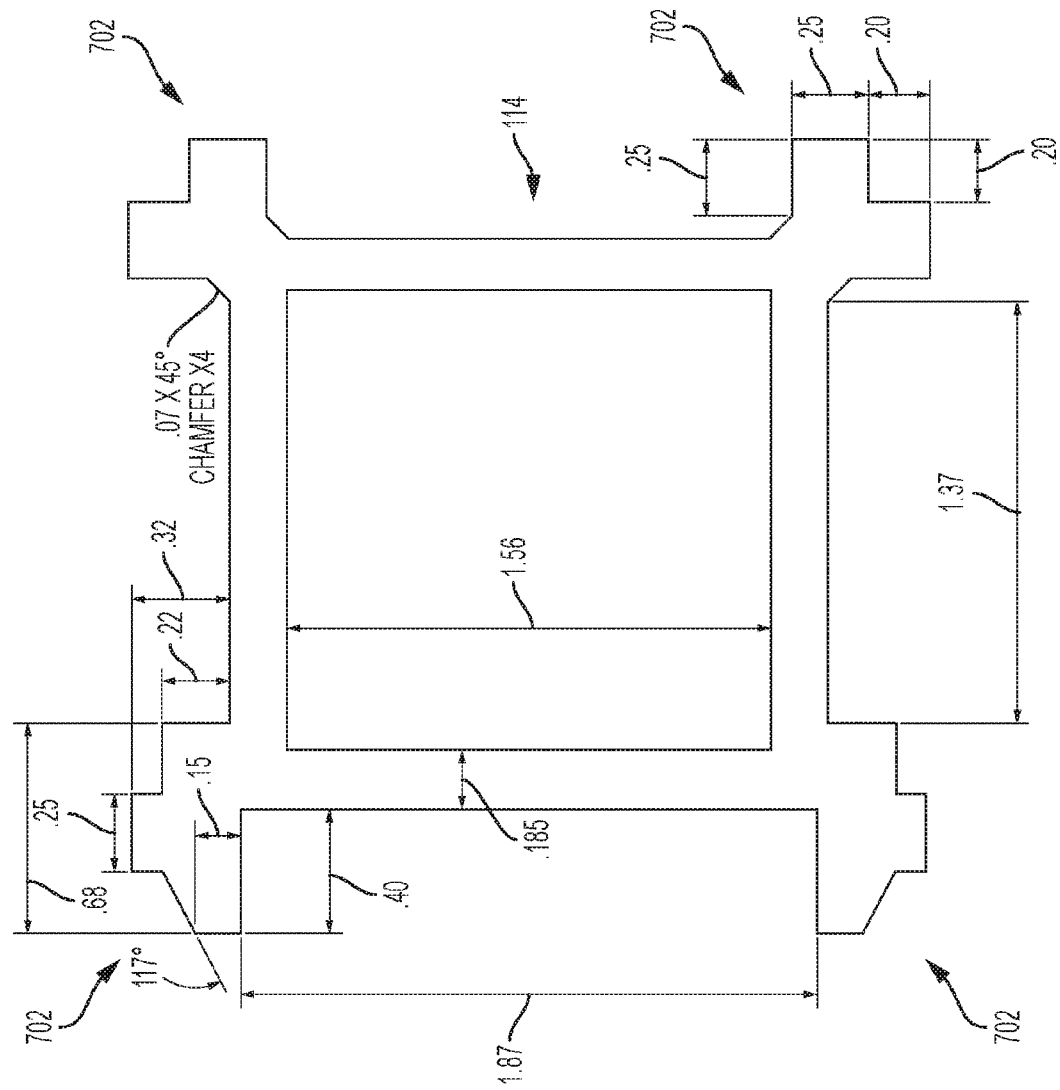

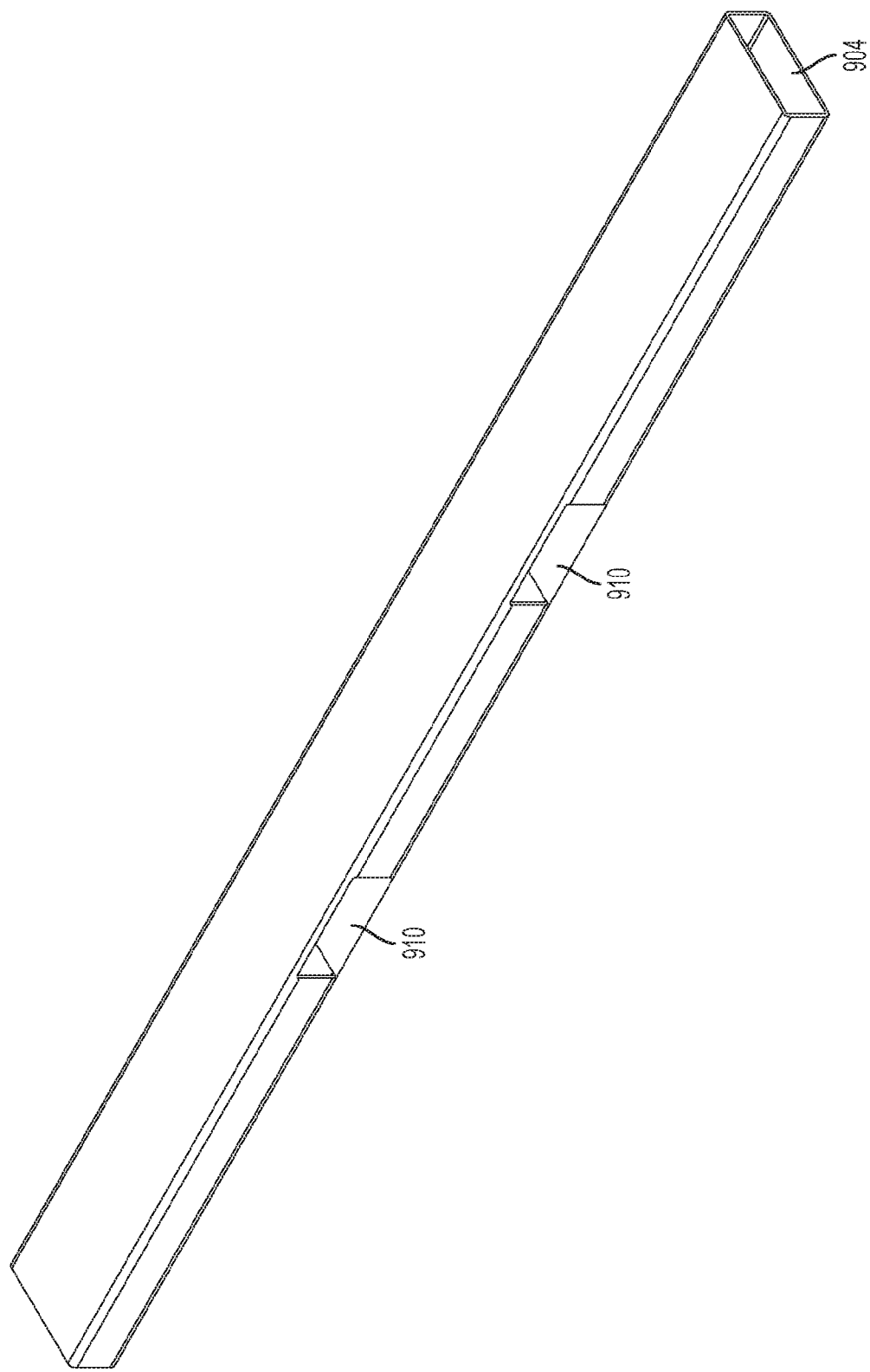

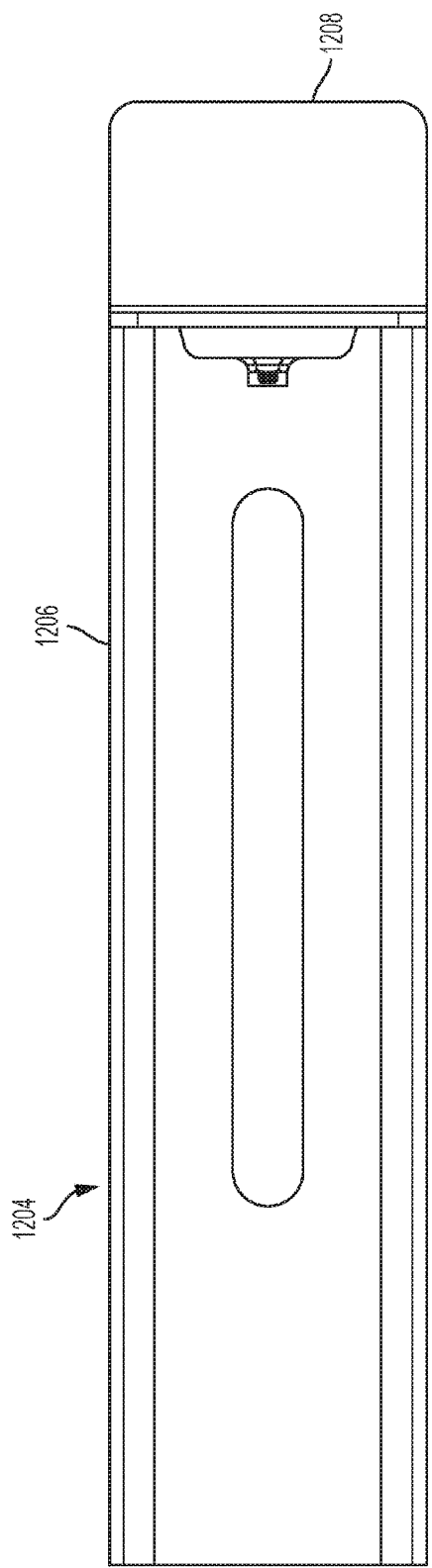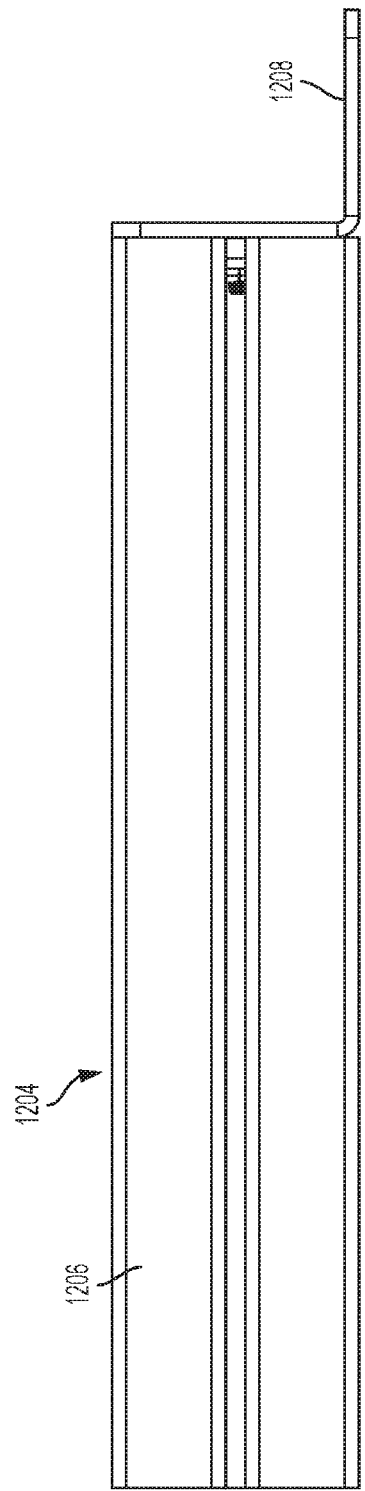
FIG. 13A
FIG. 13B

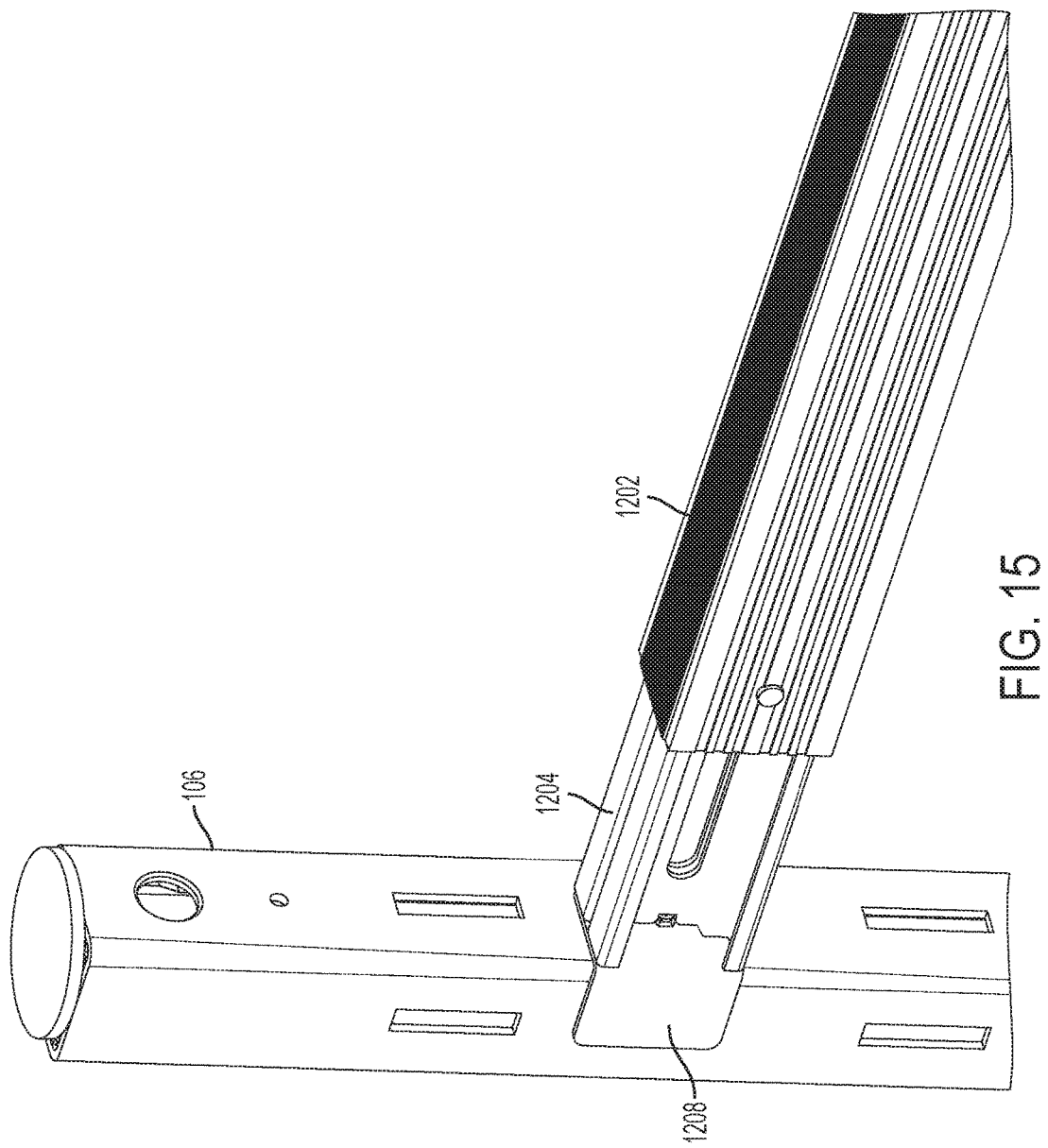

MODULAR DECK SYSTEM FOR USE WITH MOVABLE PLATFORMS

CROSS-REFERENCE TO RELATED APPLICATIONS

This application claims priority to U.S. Provisional Application Ser. No. 62/414,967, filed Oct. 31, 2016, and U.S. Provisional Application Ser. No. 62/510,032, filed May 23, 2017, the entire contents of which are hereby incorporated by reference in their entirety.

FIELD OF THE INVENTION

The present invention is directed to a modular deck system in which the height or location of decks can be adjusted on a movable platform (MP).

BACKGROUND

The trucking industry, specifically the segment consisting of Full-Truckload (FTL) and Less-than-truckload (LTL), is a segment of the shipping industry that ships a wide array of freight. The shipment sizes can vary from an individual item consisting of one piece to a full truckload consisting of several pieces. FTL freight is typically handled only once as it is loaded into a semi-trailer at the shipper's location and unloaded at the consignee's location. In the LTL industry, freight is commonly handled multiple times, with the shipper loading the freight into a semi-trailer, then the freight is returned to a local freight terminal to be unloaded/loaded into a another trailer to be routed to the destination. This process, commonly known as a hub-and-spoke network, is used to increase the efficiency of the operation by increasing density.

The traditional method of loading freight into a semi-trailer is to back a semi-trailer to a raised dock and unload each piece/pallet using a forklift. A 53' semi-trailer van can hold up to 30 pallets on the floor of the trailer. To unload a loaded semi-trailer conventionally, it requires a single forklift driver to drive into the trailer to pick-up and remove each pallet. During this unloading process, a driver could take up to 30 trips into the trailer to remove each pallet. This process is typically completed utilizing 1 forklift driver but it is possible to utilize 2 forklift drivers to unload a trailer simultaneously.

As should be apparent, this process is wasteful in that the forklift is often not conveying cargo (empty carries). Also, because the trailer is not connected to the dock, the forklift driver must be careful each time that they enter and exit the trailer. This further reduces the speed of the process. Therefore, there is clearly a need for a more efficient platform which can be used to easily remove freight from a trailer.

Further, in cross-dock operations, there is generally no easy way to modify or stack pallets or freight. This can lead to a great deal of unused capacity in a trailer. Accordingly the present invention provides a modular system enabling the easy stacking and bulk movement of freight not previously realized.

SUMMARY

The present invention utilizes a combination of a movable platform having a plurality of vertical posts with engagement members. Decks, filled with freight, can be placed onto the vertical posts at various heights at different sections of the movable platform using a conveyance vehicle. Further, the height of the vertical posts can be extended using an extension post for securing tall cargo. The decks can also be locked to the vertical posts to prevent dislodgement of the deck during transport of the movable platform.

BRIEF DESCRIPTION OF THE DRAWINGS

FIGS. 5A-5D depict views of the engagement member in isolation.

FIG. 7A-7D depict views of the extension post.

FIG. 9A-9D depict views of the deck in isolation.

FIGS. 12-15 depict an adjustable shoring beam compatible with the present invention.

DETAILED DESCRIPTION

Figure 1:
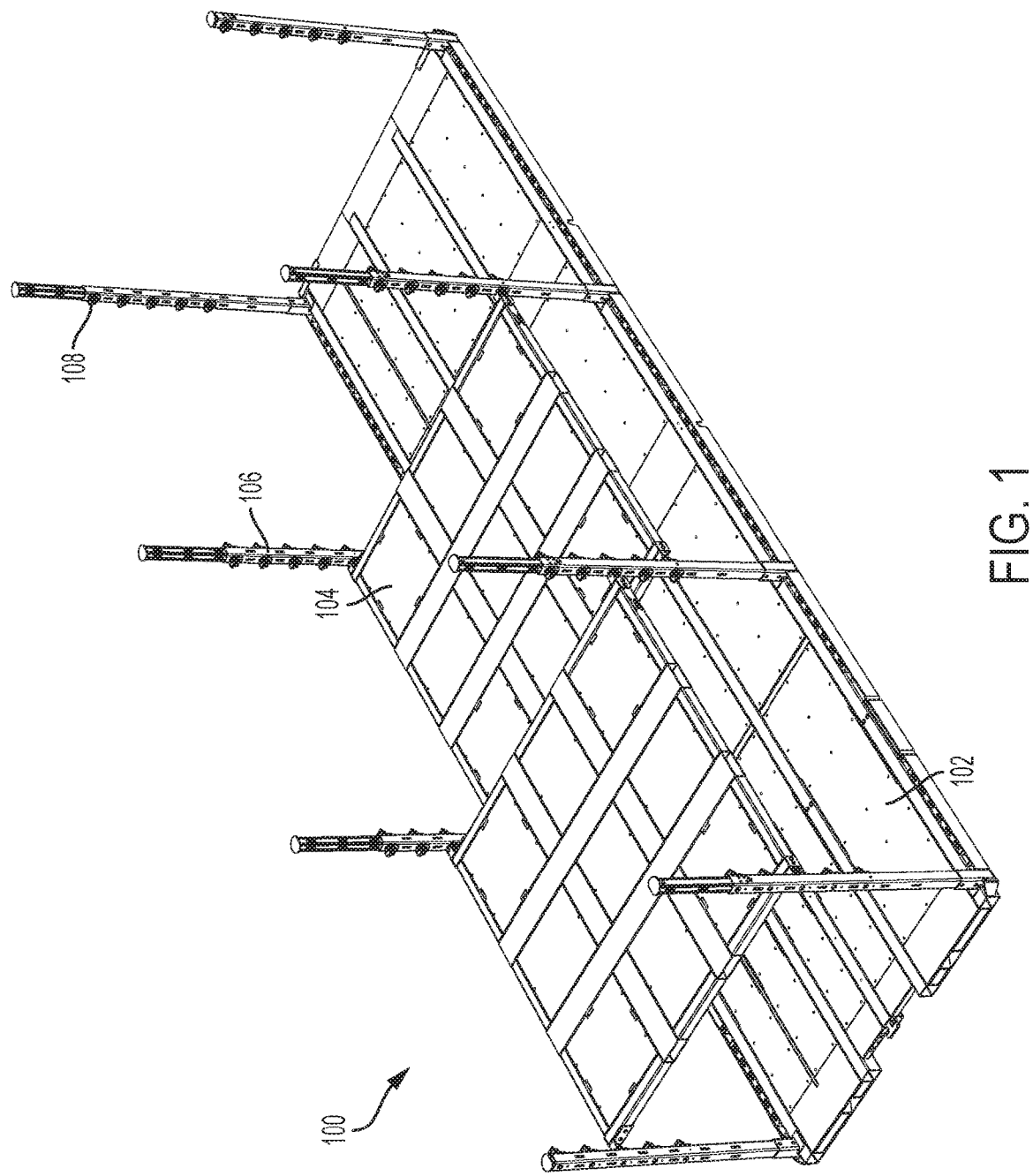
FIG. 1 depicts a perspective view of the modular deck system of the present invention.

Referring first to FIG. 1, depicted are the principal components of the modular deck system 100. As shown, modular deck system 100 generally comprises movable platform (MP) 102, decks 104, and vertical posts 106. Each vertical post 106 has a plurality of engagement members 108 which interlocks with a receiving structure (shown later) on deck 104. Preferably, the engagement members 108 are removable/replaceable from vertical posts 106. However, a plurality of engagement members 108 may be provided at a plurality of fixed heights on each vertical post 106 for uniformity. The engagement members 108 allow the height of decks 104 to be adjusted as will be described later.

The length and width of MP 102 are such that MP 102 is easily accommodated within a standard pup trailer. In a preferred embodiment, the length of MP 102 is 26 ft. and the width of MP 102 is 8 ft. However, it should be apparent that the length and width of MP 102 can be varied to accommodate any trailer dimensions.

Figure 2:
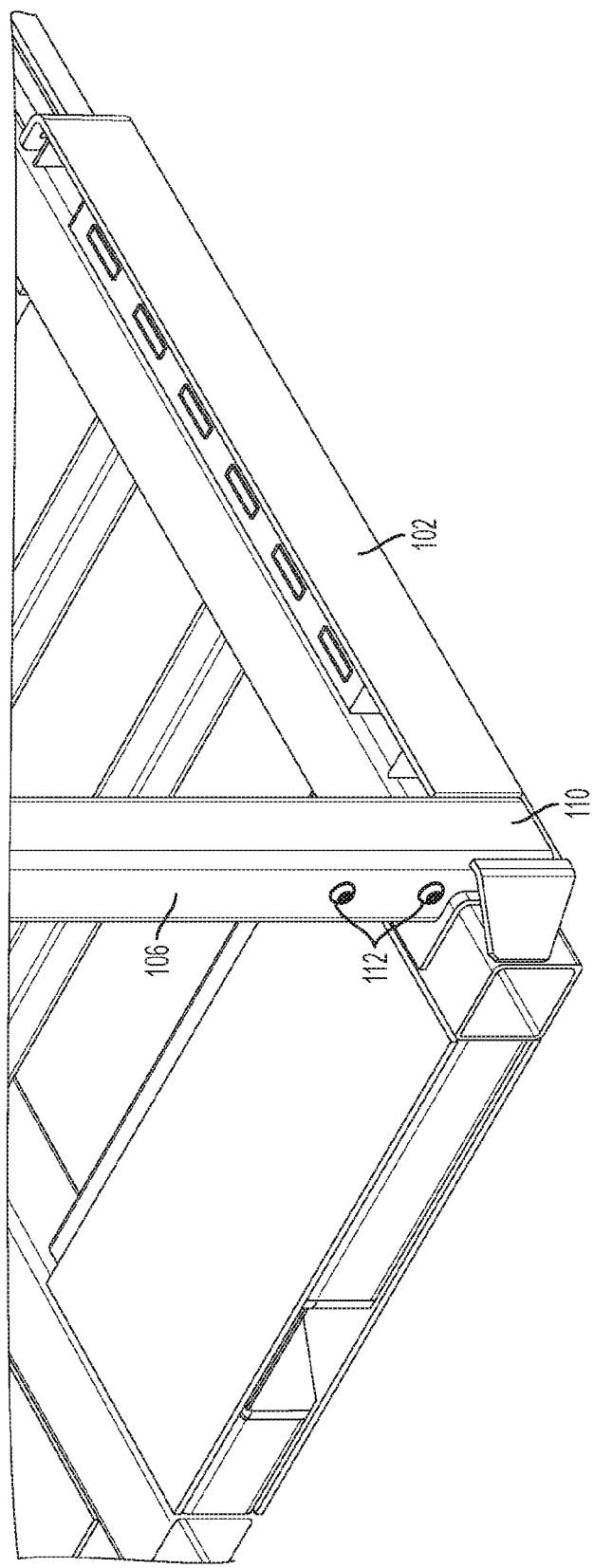
FIG. 2 depicts an enhanced view of the movable platform (MP) showing the connection for a vertical post.

As shown in FIG. 2, a bottom end of each vertical post 106 is connected to receiving structure 110 which forms a portion of the base of MP 102. Bolts 112 can be used to secure vertical posts 106 in receiving structures 110. This allows vertical posts 106 to be removed in no decks 104 are needed on a particular section of MP 102, thus increasing the modularity of modular deck system 100. The vertical posts 106 can also be permanently attached to MP 102 by welding.

Referring again to FIG. 1, vertical posts 106 are preferably equally spaced along the length of MP 102 in pairs. This allows all decks 104 to be made a standard rectangular or square size which reduces manufacturing costs. However, it should be apparent that the distance between pairs of vertical posts 106 can be varied. This modification would require that the decks 104 be manufactured in different widths and lengths.

The vertical posts 106 located at the ends of MP 102 are preferably set back from the end of MP 102 by at least a width of the engagement members 108 (e.g., 4") to allow for easier loading of MP 102 into a trailer. However, it should be apparent that vertical posts 106 may also be located at an edge of MP 102. In such an embodiment, it may be desirable to only have engagement members 108 located along inner edges of vertical posts 106 along MP 102.

Vertical Post Components

Figure 3:
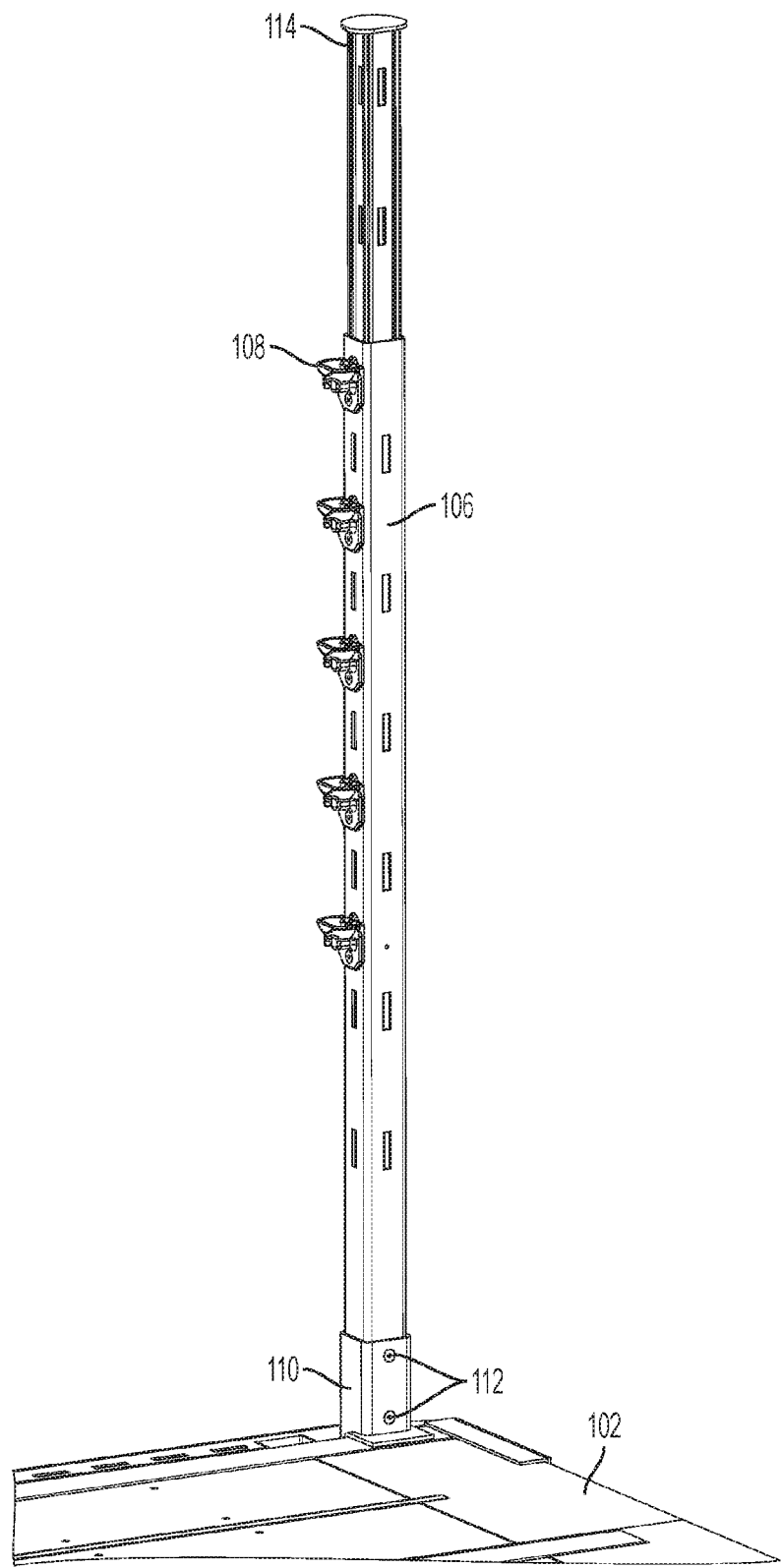
FIG. 3 depicts a vertical post attached to an MP with an extension post extended.

FIG. 3 depicts vertical post 106 inserted into receiving structure 110 and fixed with bolts 112. In this figure, the engagement members 108 can be seen in more detail. Further, extension post 114 can be seen extending from a top surface and interior of vertical post 106. As will be explained in more detail later, extension post 114 allows the height of vertical posts 106 to be increased up to 50%.

In other embodiments, extension posts 114 may be configured to extend a fixed distance based on a known height of a trailer (e.g., 20"). This provides a height gauge that can be used by a worker when loading freight onto MP 102 or decks 104.

Each vertical post 106 is preferably a square or rectangular in cross-section and is made from a durable metal such as steel or aluminum. Each vertical post 106 is preferably around 5-7' in height, but more preferably 6'. The square cross-section length and width is preferably 2-4", but more preferably approximately 4". Further, the edges of each vertical post 106 either have a 45° chamfer or a 90° corner on each of the four edges.

FIGS. 4A-4D depict left, front, right, and rear side views, respectively, of vertical post 106 in isolation. The terms left, front, right, and rear as used herein are only meant to distinguish the four sides of the vertical post 106. The sides of vertical posts 106 are able to utilize any combination of the sides described below. For example, a vertical post 106 located at a corner of MP 102 may have engagement members 108 located on perpendicular sides of vertical post 106 (front/rear and sides) whereas a vertical post located at a midpoint of MP 102 may have engagement members 108 located on opposing sides of vertical post 106 (front and rear, or left and right).

Figure 4D:
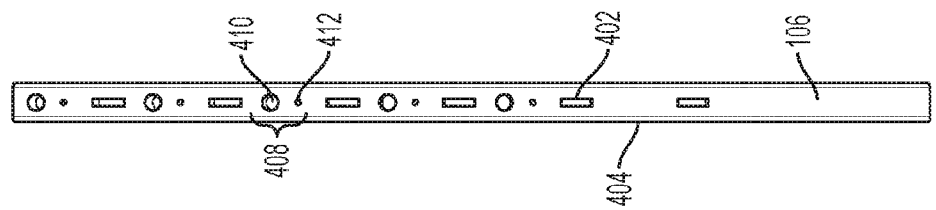
FIGS. 4A-4D depict views of the vertical post in isolation.
Figure 4C:
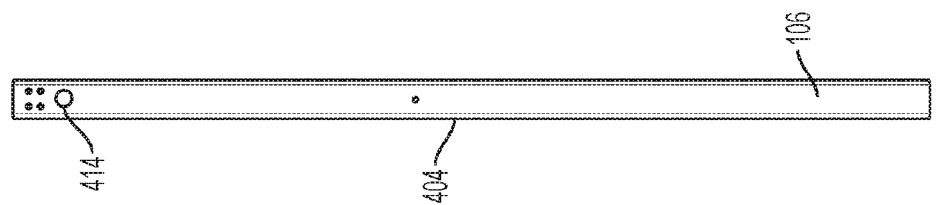
Figure 4B:
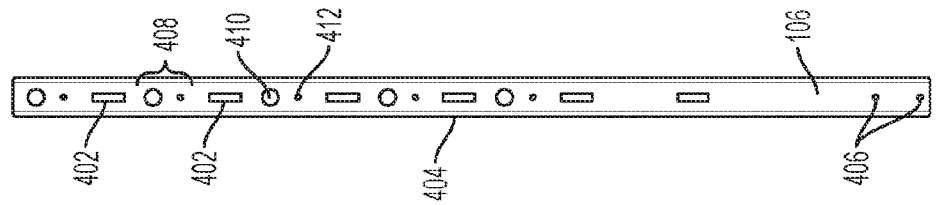
Figure 4A:
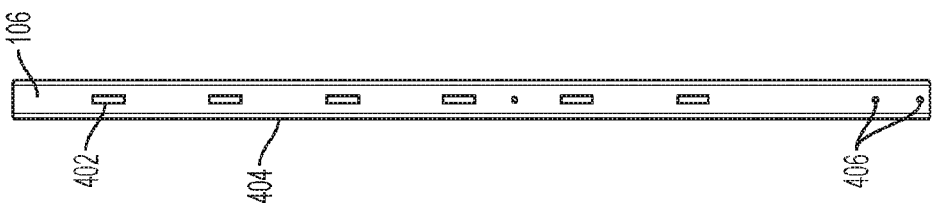

Referring first to FIG. 4A, vertical post 106 preferably contains a plurality of vertical slots 402 evenly spaced along its length along the center. Preferably, each vertical post 106 is constructed from standard tubular steel or aluminum. However, in some embodiments, vertical post 106 may also include chamfered edges 404. Each vertical slot 402 preferably has a length of approximately 2-3", but more preferably approximately 2.4". Further, each vertical slot 402 preferably has a width of 0.5-0.6", but more preferably 0.55". The first vertical slot 402 from the top of vertical post 106 is preferably spaced 6-7" from the top, but more preferably 6.1". Further, the spacing between an end of one vertical slot 402 and the beginning of the next is approximately 6-7", but more preferably 6.6". It should be apparent that the number of vertical slots 402 is only limited by the height of vertical post 106. The vertical slots 402 are generally utilized to place securement such as shoring beams or webbing to secure freight to MP 102.

The bottom edge of the left side of each vertical post 106 further comprises two fixing holes 406 which are aligned with the bolt holes in receiving structure 110 to receive bolts 112 placed there through. A screw plate, or other fixing means, can be used in the interior of vertical post 106 to receive the ends of the bolts 112 and to create a more secure connection between vertical post 106 and receiving structure 110.

FIG. 4B depicts a front view of vertical post 106. The bottom of the front of vertical post 106 again comprises an additional two fixing holes 406 for receiving bolts placed through receiving structure 110. The front of vertical post 106 also preferably contains a plurality of vertical slots 402 having the same spacing and dimensions shown in FIG. 4A. Between the vertical slots 402 are a plurality of engagement member receiving structures 408 formed from receiving hole 410 and bolt hole 412. As will be described later, the larger receiving holes 410 are sized to accommodate a hanging structure on each engagement member 108 and bolt hole 412 is used to fix an engagement member 108 after it has been inserted into receiving hole 410.

Each receiving hole 410 is approximately 1.1-1.2" in diameter, but more preferably 1.15". Further, a distance between a center of each receiving hole 410 shown in FIG. 4B is preferably 8-10", but more preferably 9". Further, a distance from a top of vertical post 106 to a center of the first receiving hole 410 is preferably 1.5-2", but more preferably 1.75". Like vertical slots 402, the number and spacing of engagement member receiving structures 408 is only limited by the length of vertical post 106.

FIG. 4C depicts a right side view of vertical post 106. This side of vertical post 106 comprises extension button 414 which is used to enable the extension/retraction of extension post 114 as will be described later.

FIG. 4D depicts a rear view of vertical post 106. The rear view of vertical post 106 is substantially identical to the front view shown in FIG. 4B except there are no fixing holes 406 located at the bottom of vertical post 406. However, it should be apparent to one of ordinary skill in the art that the right side, or any side, could also include fixing holes 406 if necessary.

Engagement Members

Figure 5C:
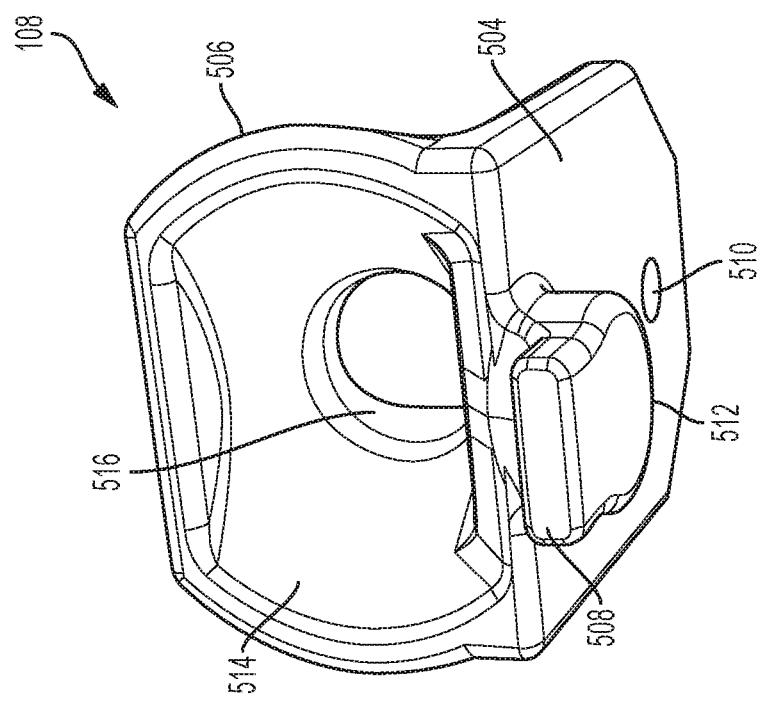

Referring next to FIGS. 5A-5D, depicted are various views of a single engagement member 108 in isolation. Referring first to FIG. 5A, depicted is a front perspective view of engagement member 108 showing its principal components. Generally, engagement member 108 comprises hanging member 502, face plate 504, and receiving cup 506. Hanging member 502 is sized to allow engagement member 108 to be inserted into receiving hole 410 by first inserting lip 508 into receiving hole 410 at an angle and then rotating engagement member 108 in a downward direction until the flat rear surface of face plate 504 engages an exterior of vertical post 106 and a front surface of lip 508 engages an interior surface of vertical post 106. A bolt can then be placed through bolt holes 510 and 412 to fix engagement member 108 to vertical post 106. FIGS. 5B and 5C depict that a lower portion 512 of hanging member 502 has a semi-circular shape which mates with receiving hole 410 to help prevent movement of engagement member 108.

FIG. 5C depicts a top perspective view of engagement member 108 showing additional details about receiving cup 506. Generally, receiving cup 506 comprises receiving surface 514 and receiving hole 516. The top of receiving cup 506 has a rectangular shaped cross-section having curved sides. Receiving surface 514 and receiving hole 516 form a "funnel-like" structure that guides any pin type structure placed anywhere within receiving cup 506 into receiving hole 516. Receiving hole 516 preferably has a diameter of approximately 1". Receiving surface 514 may be formed from one or more curved and/or angled surfaces as shown in FIG. 5C. The opening to receiving cup 506 is preferably 2-3" in width and 2-4" in length with a total depth of approximately 2-2.5".

Figure 5D:
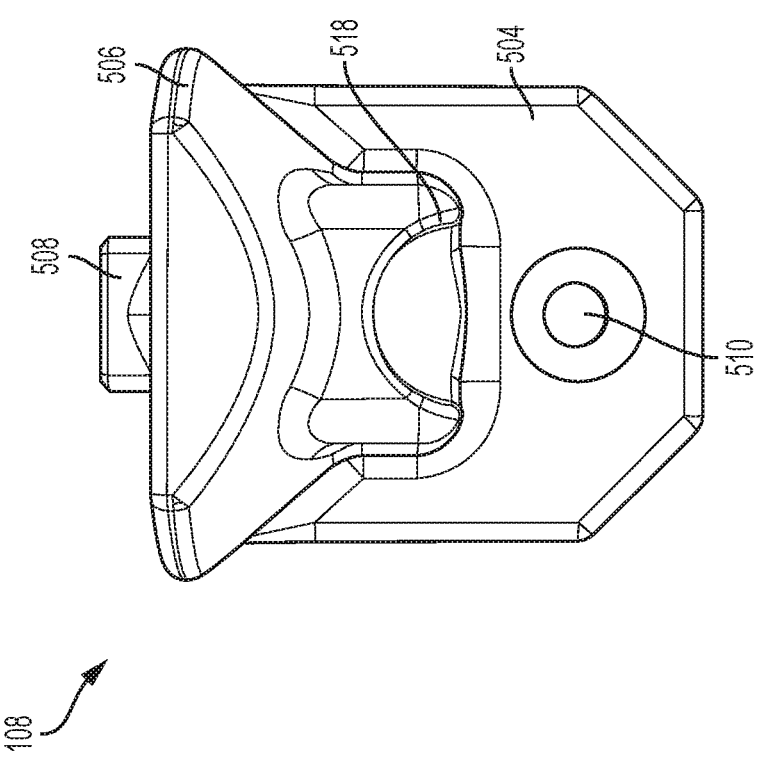

FIG. 5D depicts a front view of an engagement member 108. Receiving cup 506 preferably further comprises curved bore 518 along its center which intersects with receiving hole 516. Curved bore 518 is designed to interface with a locking mechanism (to be described later) which can be used to lock decks 104 onto vertical posts 106.

Figure 6:
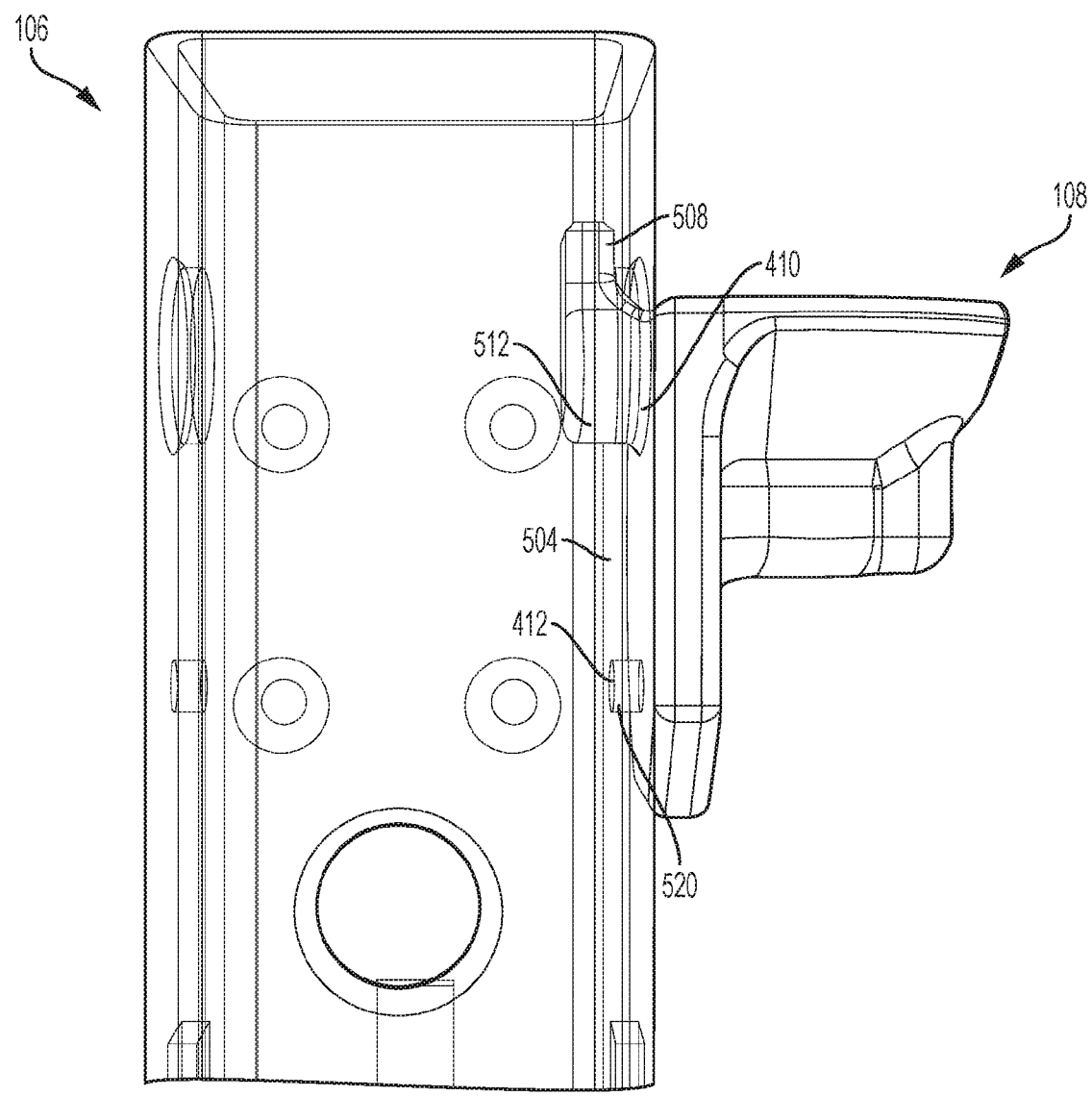
FIG. 6 depicts a side view showing an engagement member attached to a vertical post.

FIG. 6 shows an engagement member 108 inserted into an engagement member receiving structure 408 of vertical post 106. As already described, a front surface of lip 508 contacts an interior of vertical post 106 and the flat rear surface of face plate 504 contacts an exterior of vertical post 106. Further, lower portion 512 of hanging member 502 fills the majority of receiving hole 410. Bolt 520 is placed through bolt holes 510 and 412 to releasably secure engagement member 108 to vertical post 106.

Extension Post

Figure 7A:
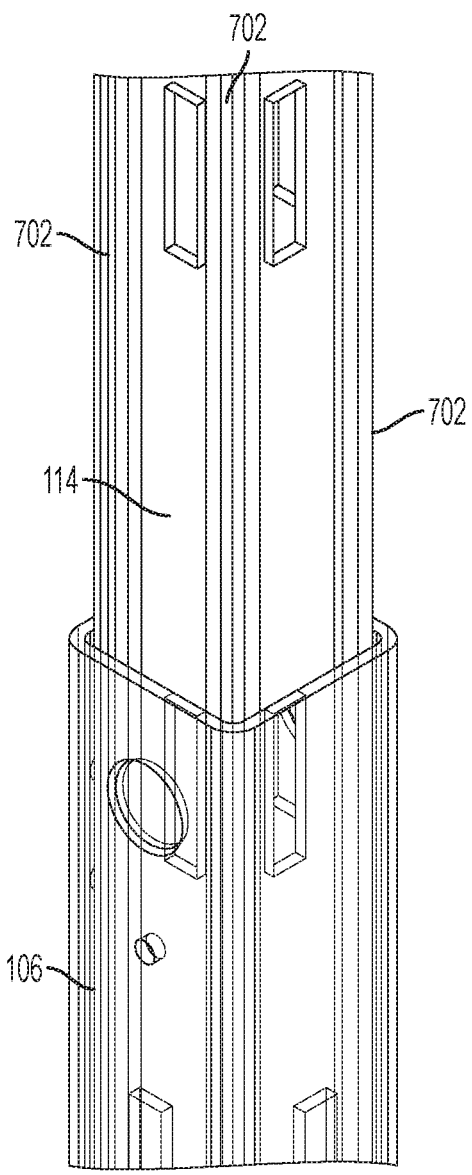

Referring next to FIG. 7A, shown is close-up perspective view of extension post 114 extending from vertical post 106. As shown, extension post 114 must have a slightly smaller length and width than that of vertical post 106 to allow extension post 114 to easily slide relative to vertical post 106. To allow for easier sliding, each corner of extension post 114 preferably comprises a rail 702. The rails 702 may all be uniform or varied.

FIG. 7B shows a top cross-section of extension post 114 showing sample rails 702 in more detail. The depicted dimensions are all in inches. FIG. 7B depicts that the rails 702 located on a first side of extension post 114 have a first cross-section whereas the rails 702 located on a second side of extension post 114 have a second cross-section. The cross-sections depicted in FIG. 7B is meant only to be exemplary and it should be obvious to one of ordinary skill in the art that other cross-sections may be utilized. Further, other or additional components may be used in addition to rails such as a greased connection or wheels/bearings.

Figure 7C:
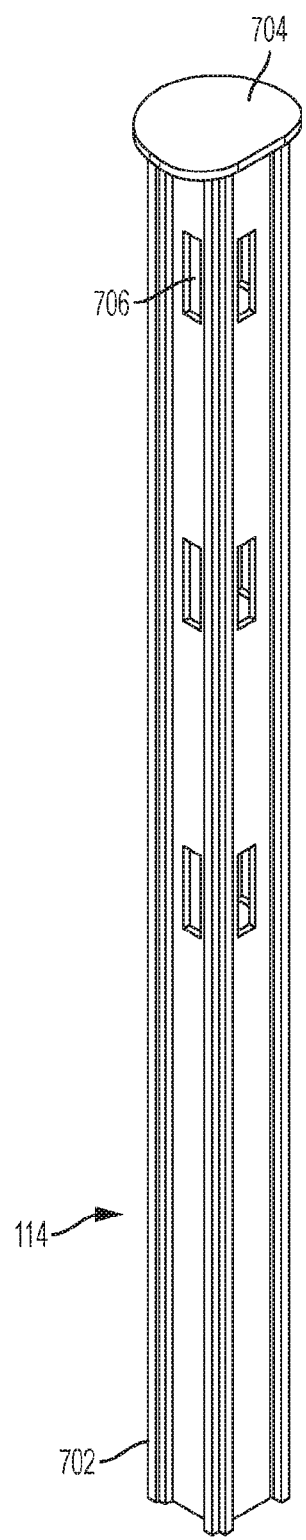

FIG. 7C depicts extension post 114 in isolation. Extension post 114 may further comprise cap 704 which helps a user lift extension post 114 from the top of vertical post 106 and prevents extension post 114 from accidentally dropping into vertical post 106, making it harder to retrieve. Cap 704 is also useful in preventing extension post 114 from snagging trailers or freight during transport. Cap 704 preferably has a larger cross-section than extension post 114. In a preferred embodiment, cap 704 is preferably 4-5" in length and/or width.

Extension post 114 is preferably 38-42" in length, but more preferably approximately 39.875" in length. And, as already described, the dimensions of extension post 114 are only constrained by the sizing of vertical post 106 which it must fit into.

Extension post 114 also comprises a plurality of vertical slots 706 which are preferably identical in size, shape, and spacing to vertical slots 402 depicted in FIG. 4A. The vertical slots may be present on any sides of extension post 114 as required by intended use.

Figure 7D:
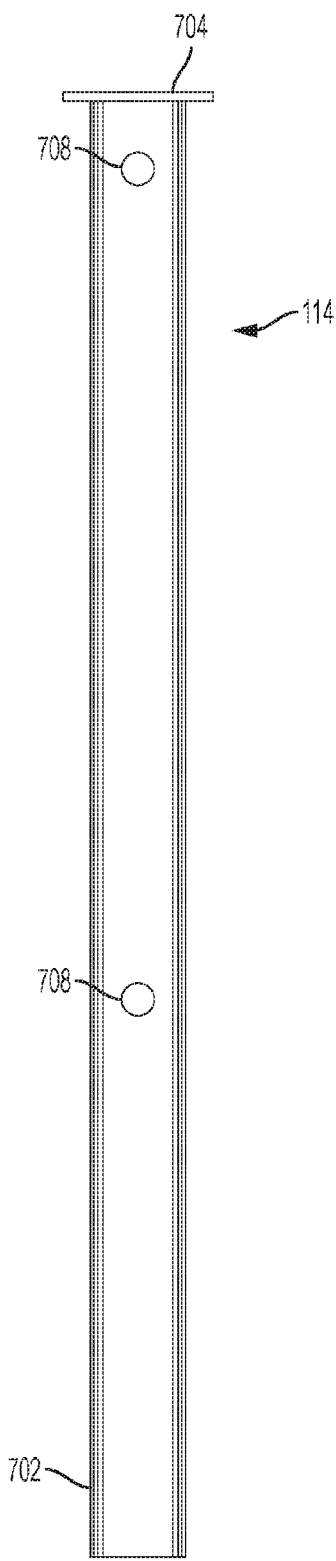

FIG. 7D depicts another side view of extension post 114 showing two locking holes 708 used to lock extension post 114 in an extended position (bottom) and in a collapsed position (top).

Locking System for Extension Post

Extension post 114 may utilize any known method to be maintained in the extended position. For example, the length of extension post 114 may comprise a number of through holes and a locking pin may be placed through vertical post 106 and extension post 114. However, such a locking system may potentially be dangerous in a warehouse setting. If a user is not paying attention and removes the pin, the extension post 114 would immediately collapse into vertical post 106 and cap 704 could injure the worker as it comes into contact with the top of vertical post 106. Therefore, described below is a locking system which allows extension post 114 to be extended and collapsed in a safer manner.

Figure 8A:
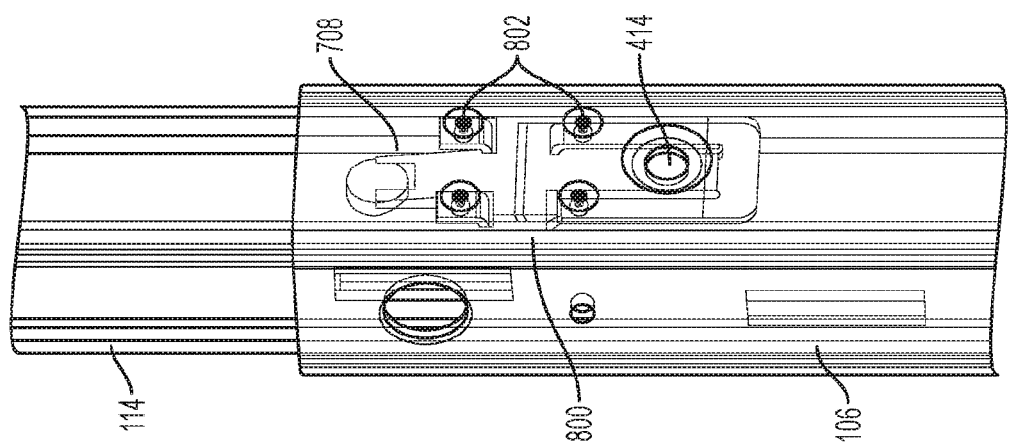
FIG. 8A-8C depict views of the locking system for the extension post.
Figure 8B:
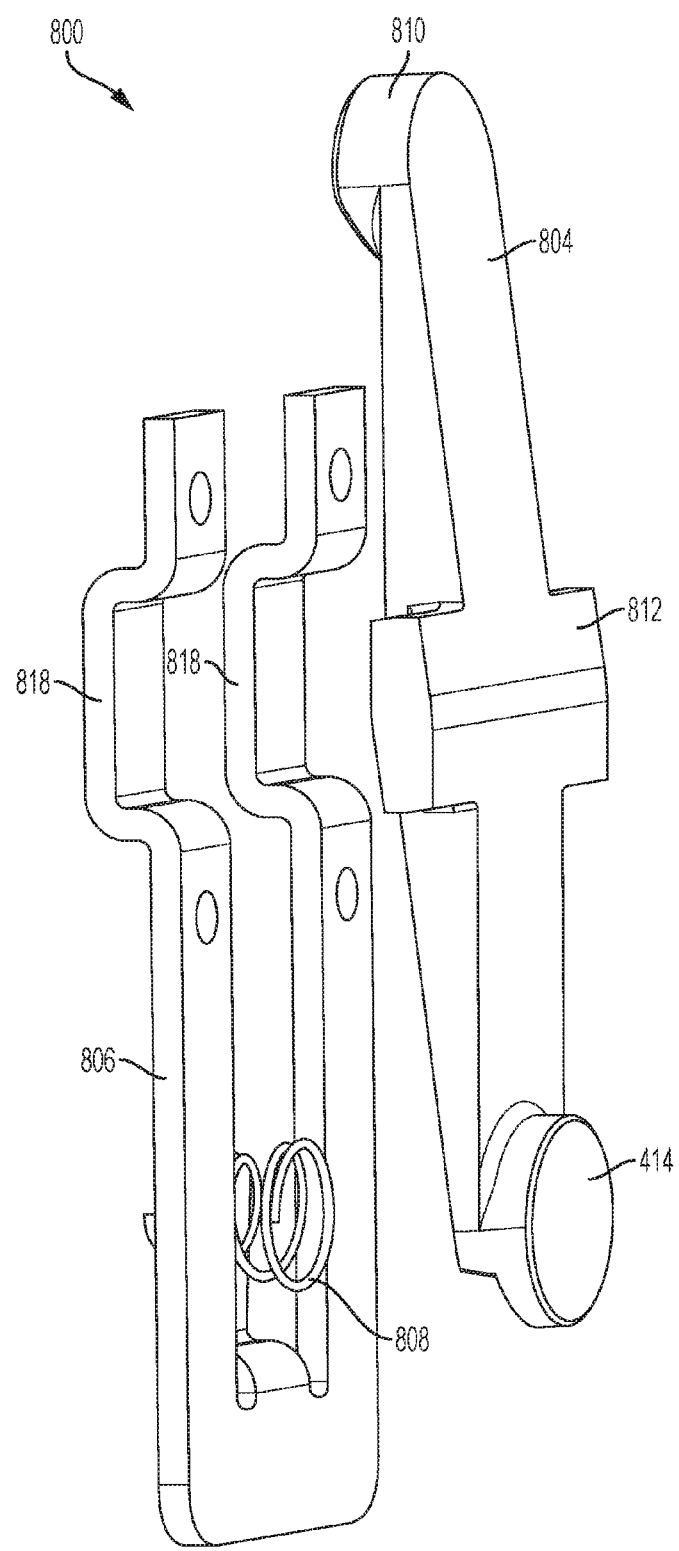

FIG. 8A depicts locking system 800 engaging a locking hole 708 on extension post 114. Vertical post 106 is shown in phantom so that locking system 800 is viewable. Locking system 800 is fixed to an interior of vertical post 106 using bolts 802. FIG. 8B depicts a front perspective exploded view of locking system 800 in isolation. Locking system 800 comprises locking member 804, biasing member 806, and spring 808.

Locking member 804 comprises button 414 and locking button 810 which is sized to fit snugly into locking holes 708 on extension post 114. A central portion of locking member 802 comprises rocking member 812 which is wider than the other portions of locking member 802.

Biasing member 806 includes spring surface 814. Spring 808 is contained between spring surface 814 and a rear of button 414. The force exerted on button 414 by spring 808 ensures that locking button 810 remains within locking hole 708 until an external force pushes button 414.

Figure 8C:
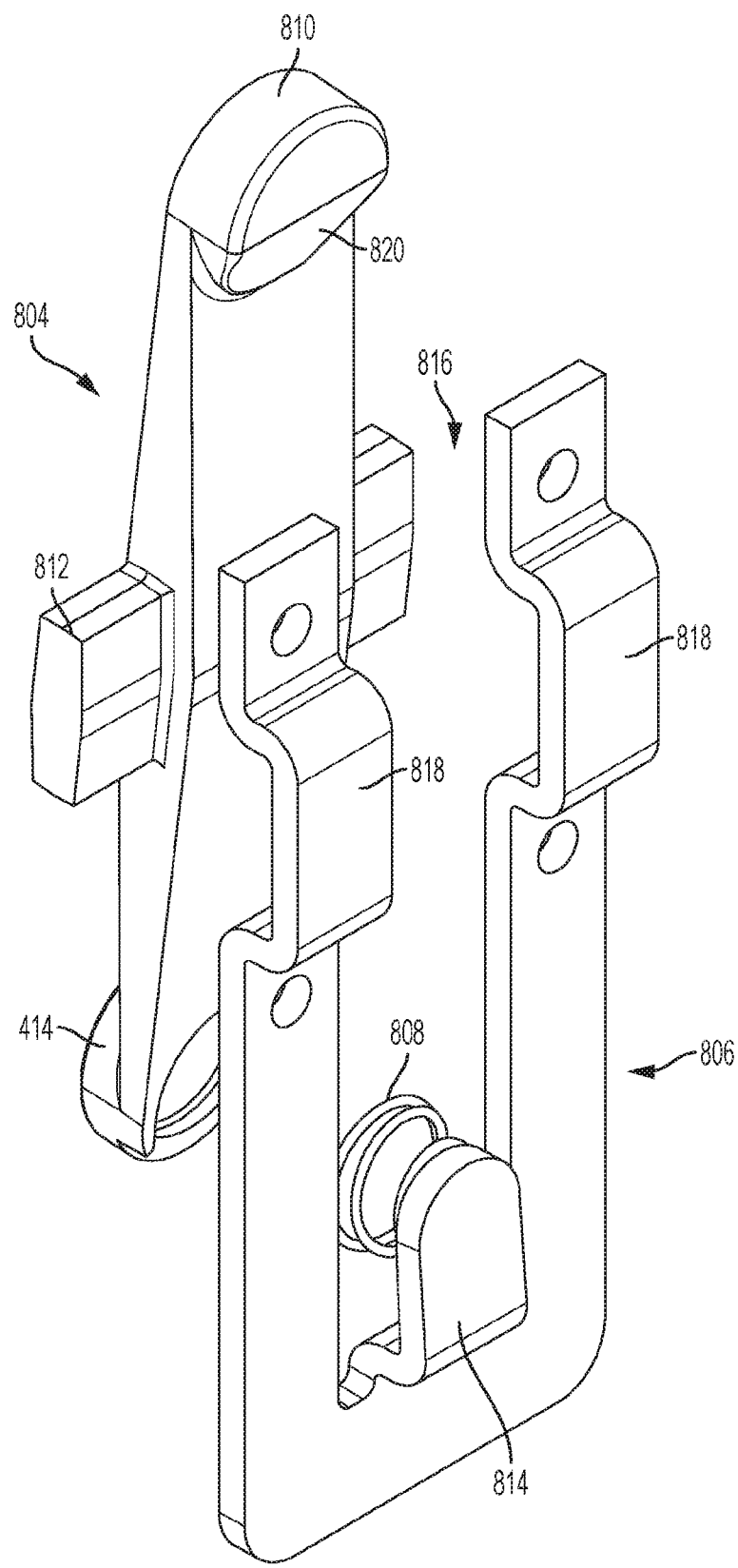

Biasing member 806 further comprises central channel 816 as depicted in FIG. 8C. Central channel 816 is wider than the body of locking member 804 with the exception of rocking member 812. The upper portion of biasing member 806 comprises two recesses 818 sized to accommodate rocking member 812. The lower half of locking button 810 comprises a 45° bevel 820 allowing extension post 114 to be extended without button 414 being pressed.

When button 414 is pressed, spring 808 compresses, causing locking member 804 to rotate about an axis centered at rocking member 812. In turn, locking button 810 becomes disengaged from locking hole 708, allowing extension post 114 to be extended or retracted within vertical post 106.

Locking system 800 is designed to have a total thickness of less than 0.5" when assembled and a width less than the distance between channels 702 of extension post 114 so it does not interfere with the extension or collapsing of extension post 114.

Deck Construction

Figure 9A:
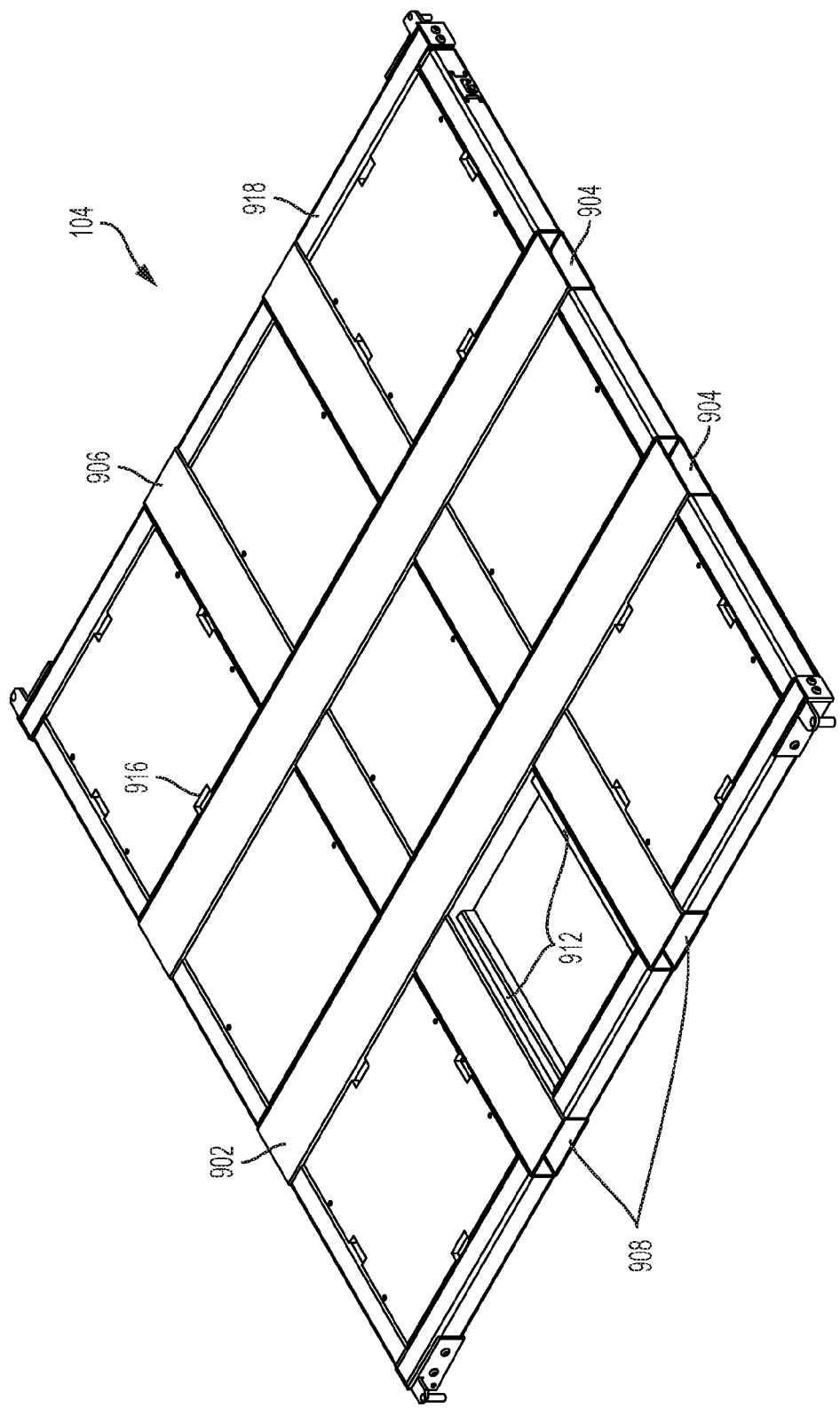

FIG. 9A depicts a perspective view of deck 104. Deck 104 comprises beams 902 having openings 904 and six cross-members 906 having openings 908. A single beam 902 is depicted in FIG. 9B. Beam 902 has a rectangular cross-section approximately 7-9" in width and approximately 2-4" in height. More preferably, the cross-section is 8" in width and 3" in height. The length of each beam 904 is approximately 90". Beam 902 further comprises rectangular cutouts 910 measuring approximately 2.5" in height and 7.5" in width. Deck 104 preferably has a length of approximately 89-90" and width of approximately 91-92" for a roll door trailer and a length of 93-94" and a width of 91-92" for a swing door trailer.

Beams 902 and cross-members 906 are preferably welded together in the layout depicted in FIG. 9A. Beams 902 and cross-members 906 all have open ends which creates two channels extending the entire length of deck 104 and two channels extending the entire width of deck 104. The openings 904 and 908, as well as the channels, are sized to accommodate standard forklift tines, thereby allowing deck 104 to be picked up from any side for conveyance on a cross-dock.

Attached (e.g., welded) to the sides of beams 904 and/or cross-members 906 are support members 912 which are used to support decking 914. A single piece of decking 914 is shown removed in order to reveal support members 912 in FIG. 9A. The decking 914 is preferably fixed to support members 914 using screws or another releasable connection. The outer border of decking 914 may comprise cutouts 916 to allow the decking 914 to easily be lifted and/or repositioned. Decking 914 is preferably made of a lightweight and readily available material such as plywood or plastic. However, it should be obvious to one of ordinary skill in the art that other materials, such as metallic mesh, may also be utilized.

Figure 9C:
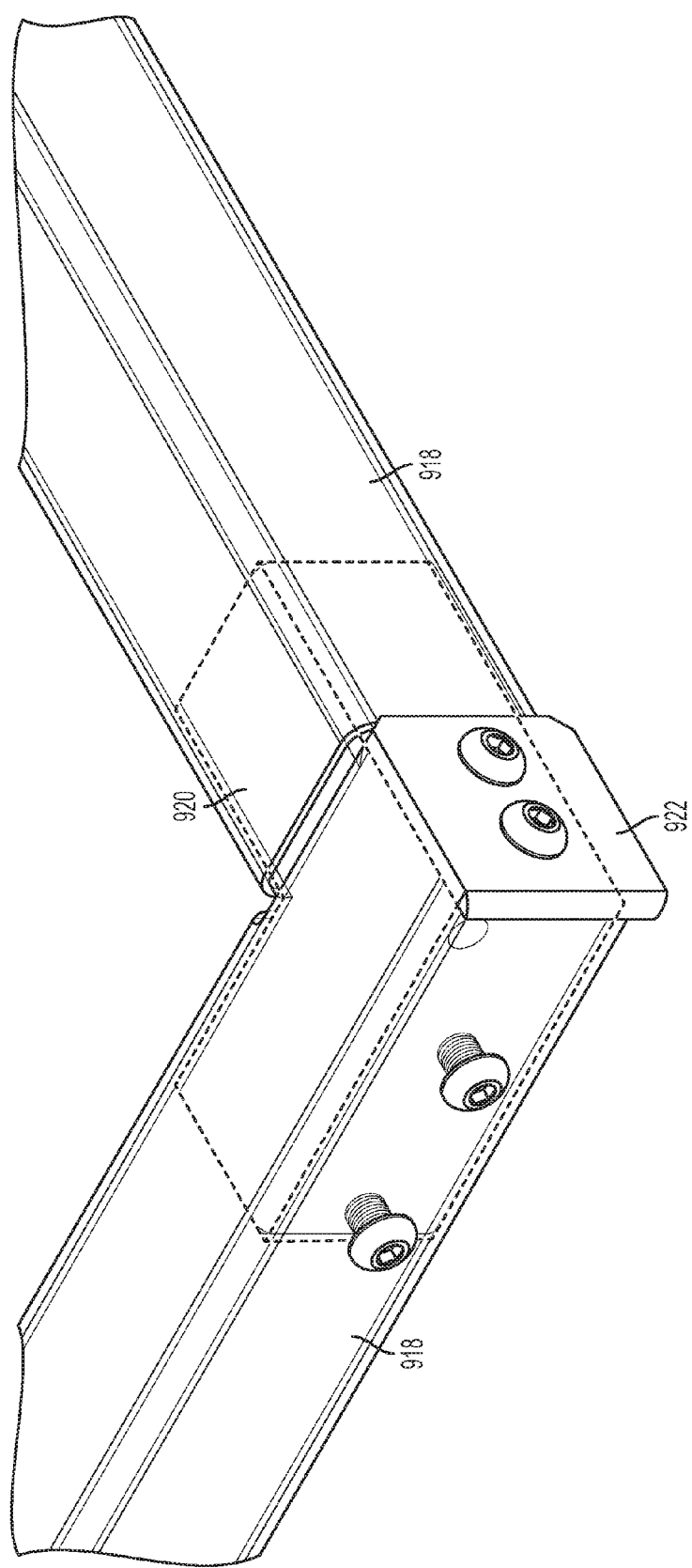

The remainder of the outer edge of the frame of deck 104 is formed by deck beams 918. The connection between beams 902 and cross-members 906 with deck beams 918 is preferably a welded connection. However, the corners of deck 104 may utilize a bolted connection as depicted in FIG. 9C. Here, sleeve 920 shown in broken lines, having an L-shape, is inserted into the ends of deck beams 918 before bolts are inserted to connect the deck beams 918. An end plate 922 may also further be used to strengthen the connection. As will be shown later, the corners of deck 104 must be very rigid because they support the weight of deck 104 when it is placed on vertical posts 106 as depicted in FIG. 1.

Figure 9D:
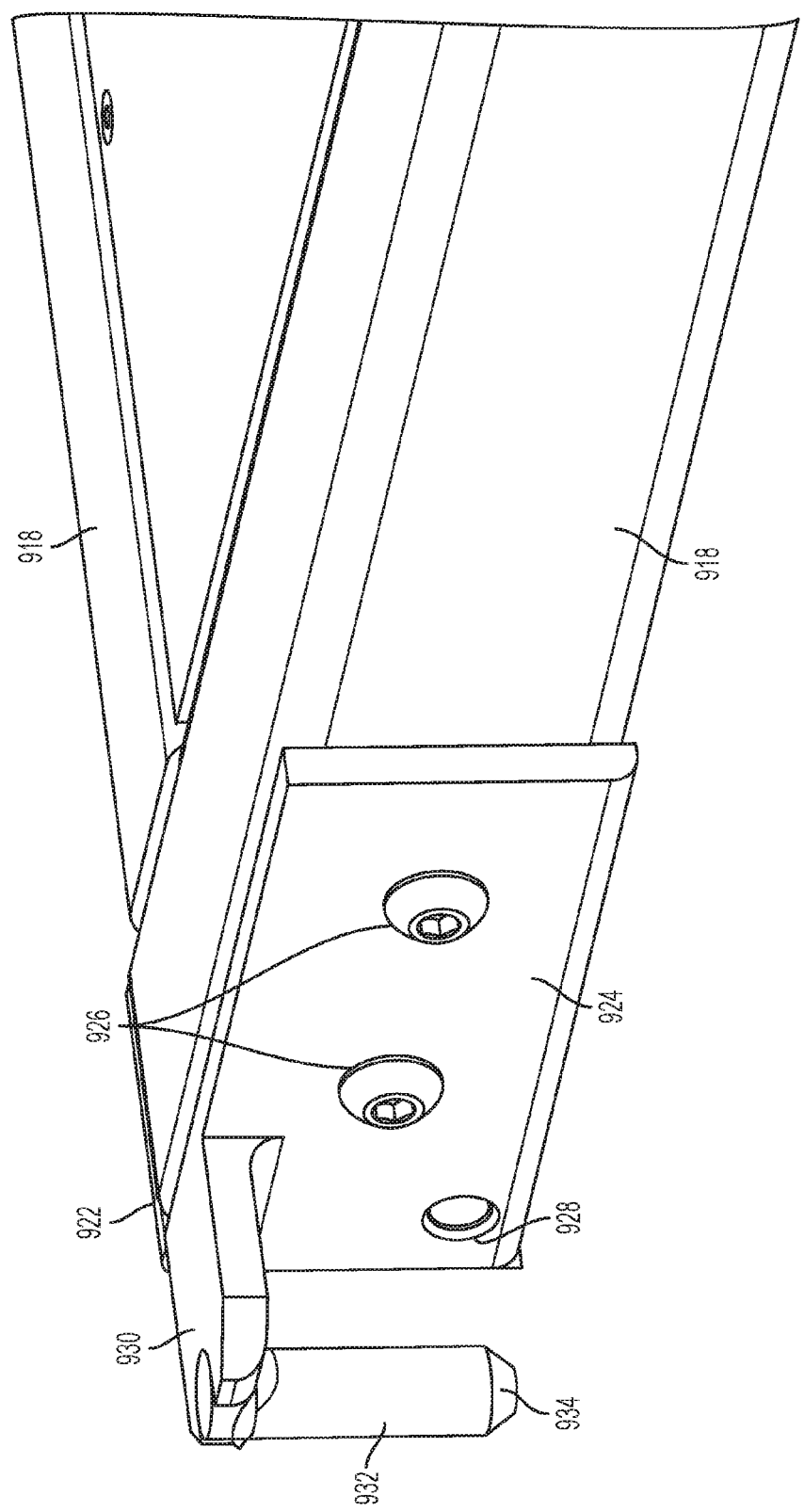

FIG. 9D depicts a perspective view of a corner of deck 104 opposite that of FIG. 9C. Each corner of deck 104 preferably has the same construction. Specifically, FIG. 9D depicts hanger bracket 924 which is attached to the edge of deck 104 near end plate 922. Hanger bracket 924 comprises bolt holes 926 so that hanger bracket can be mounted to deck 104 (through deck beams 918 and sleeve 920). Hanger bracket 924 also comprises lock opening 928 through which a locking mechanism can be extended/retracted as will be described later. Extension 930 extends perpendicular from the top face of hanger bracket 924 and terminates with pin 932. Extension 930 is approximately 2-4" in length, but more preferably 3". Further, pin 932 is preferably 2-3" in length with a 30-40° chamfered tip 934 extending for 0.2-0.3". The chamfered tip of pin 932 enables placement of deck 104 on vertical posts 104.

Figure 10:
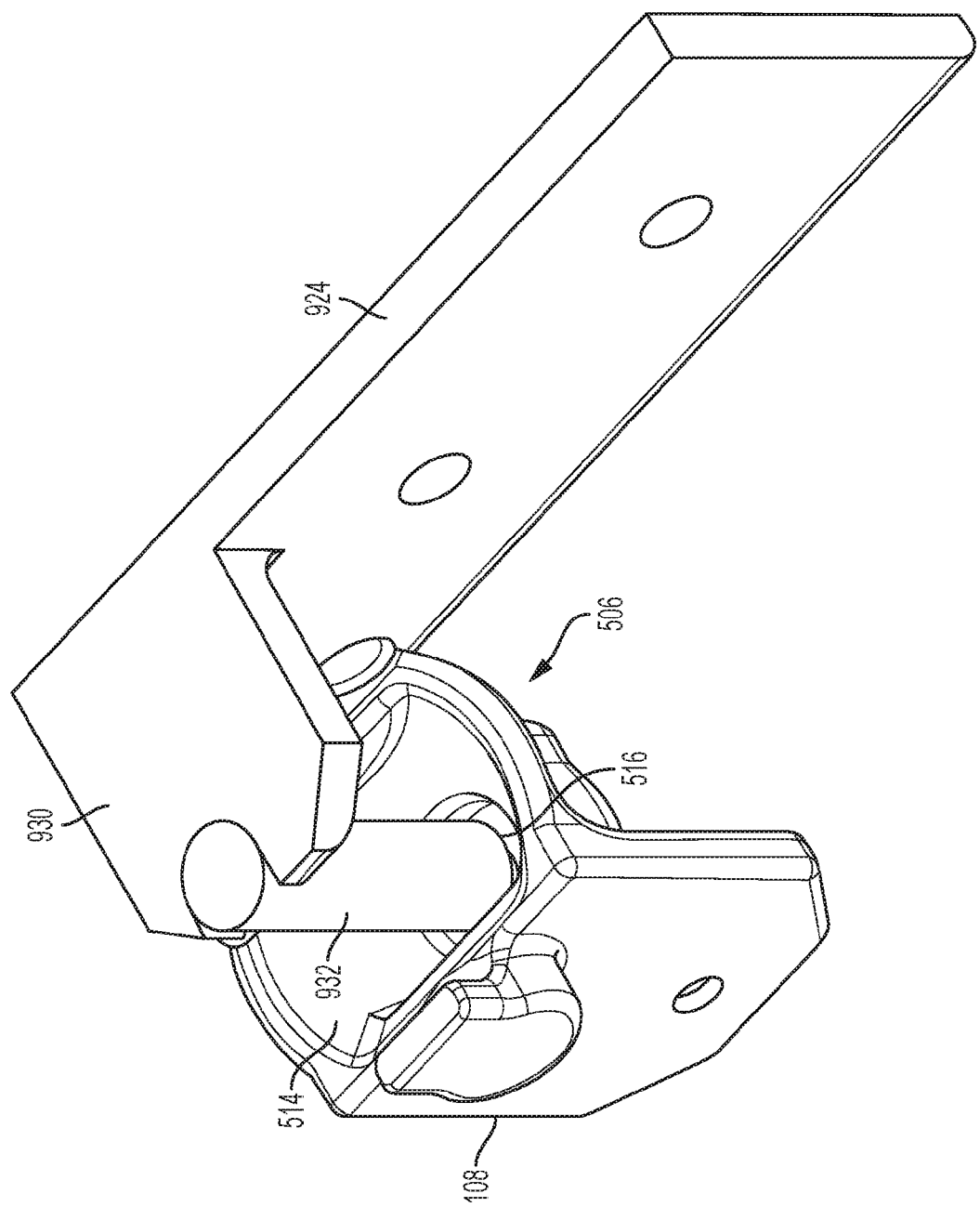
FIG. 10 depicts the insertion of the pin of the hanger bracket into the engagement member.

Referring now to FIG. 10, depicted is the placement of pin 932 into engagement member 108 which occurs as deck 104 is placed onto vertical posts 104. As shown, receiving hole 516 is not much larger than the diameter of pin 932. However, receiving surface 514 is much wider than either pin 932 or receiving hole 516. Thus, as long as pin 932 is placed anywhere along receiving surface 514, the angled receiving surface 514 will guide pin 932 into receiving hole 516. Further, even if pin 932 is lowered when it is at an edge of the receiving cup 506, the chamfered tip 934 of pin 932 will help guide pin 932 onto receiving surface 514 and into receiving hole 516. Because deck 104 will typically be placed by a forklift or other conveyance vehicle which may not have great accuracy or fine positioning, the deck 104 will be properly placed onto vertical posts 106 as long as the forklift tines are lowered when pin 932 is anywhere above receiving surface 514 and/or receiving hole 516, allowing for faster placement without requiring exact preciseness.

Locking Mechanism

Figure 11A:
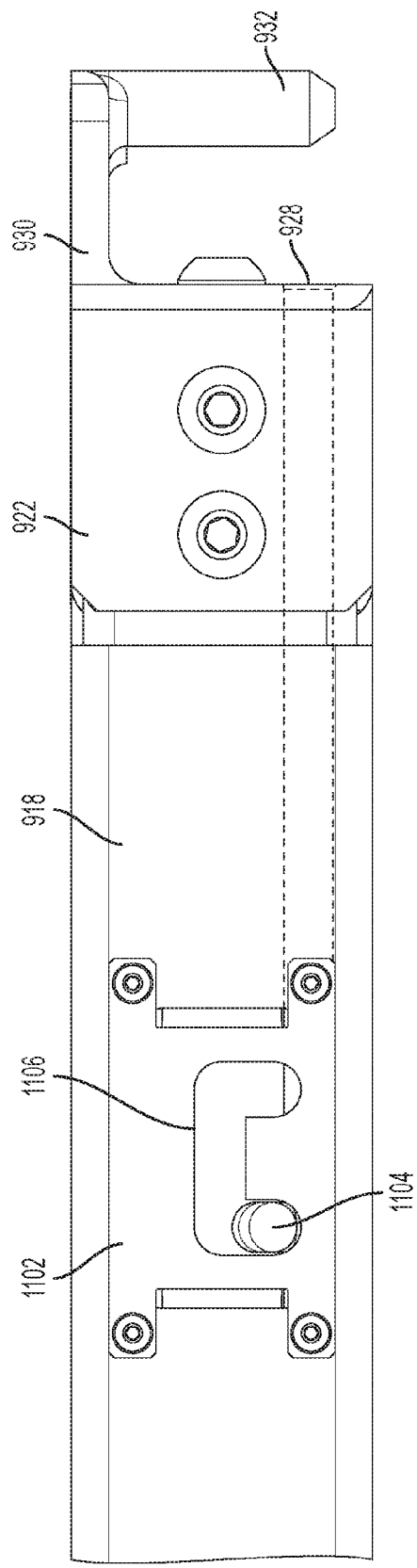
FIGS. 11A-11B depict the locking mechanism used for locking a deck to a vertical post.

A locking mechanism 1100 that can be used to lock deck 104 in placed on engagement members 108 is now described with reference to FIGS. 11A and 11B. FIG. 11A shows the locking mechanism 1100 before locking. As shown, locking mechanism 1100 generally comprises lock face plate 1102 and locking pin 1104. In the open position, a first tip of locking pin 1104 resides in the left hand side of lock slot 1106. A second tip of locking pin 1104 resides in lock hole 928 but does not extend past an edge of hanger bracket 924. When the locking pin 1104 is in this position, it cannot freely slide (to the right) and will remain in this position during transport of deck 104.

Locking mechanism 1100 can easily be assembled by first sliding locking pin 1104 through an opening in deck beam 918 and into lock hole 928 (through a corresponding opening in sleeve 920). The lock face plate 1102 is then attached to decking beam 918 using any known fastening mechanisms, such as bolts.

Figure 11B:
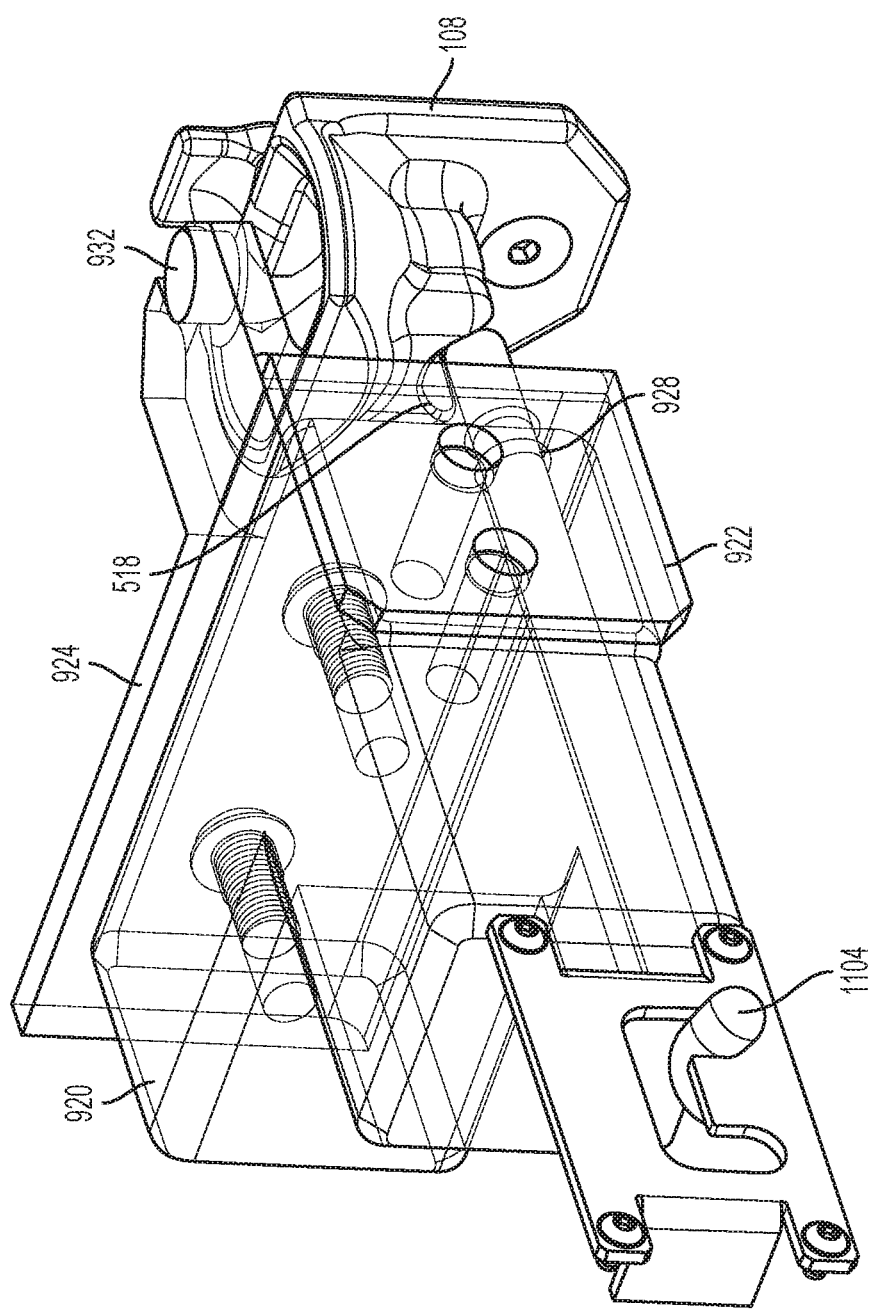

Referring now to FIG. 11B, depicted is locking mechanism 1100 in the locked position. After pin 932 has been placed into engagement member 108, locking pin 1104 is slid across lock slot from the position depicted in FIG. 11A to the position depicted in FIG. 11B. As shown, this causes a tip of locking pin 1104 to exit lock hole 928 and extend under curved bore 518 of engagement member 108. Placing the tip of locking pin 1104 into the right side of lock slot 1106 also prevents locking mechanism 1100 from accidentally disengaging. The placement of locking pin 1104 under curved bore 518 prevents deck 104 from being lifted off vertical posts 106 during transport.

Magnetic Shoring Beam

Figure 12:
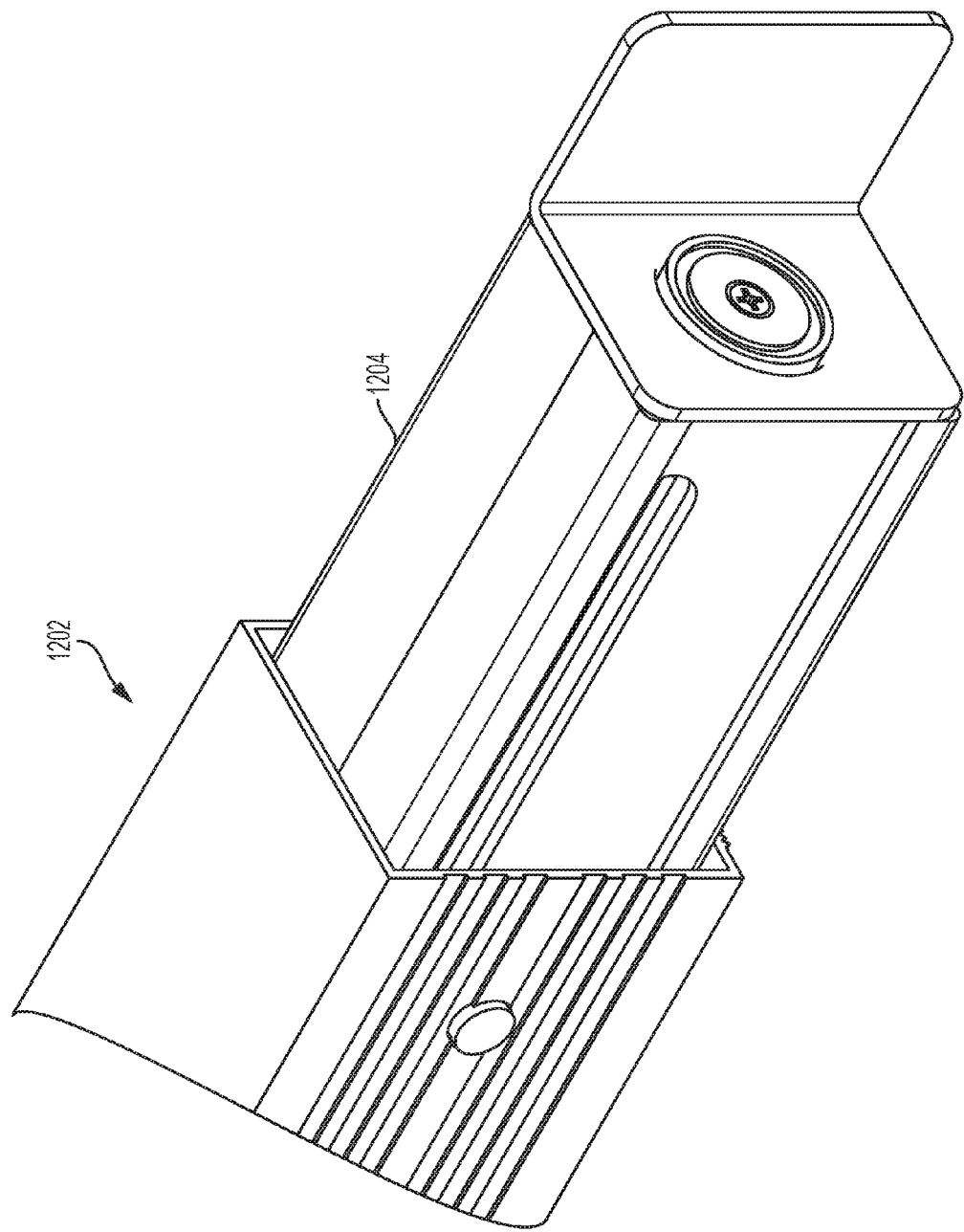

Referring to FIG. 12, depicted is an adjustable shoring beam 1202 which can be placed anywhere in modular deck system 100 using vertical slots 402 or 706. Conventional shoring beams are common load-bearing freight securement devices that extend and retract with ends that lock into track systems, i.e. E-track and A-track. The beam is adjustable by either one or two sliding subassemblies 1204 located at the ends of adjustable shoring beam 1202 as depicted in FIG. 12.

Figure 13C:
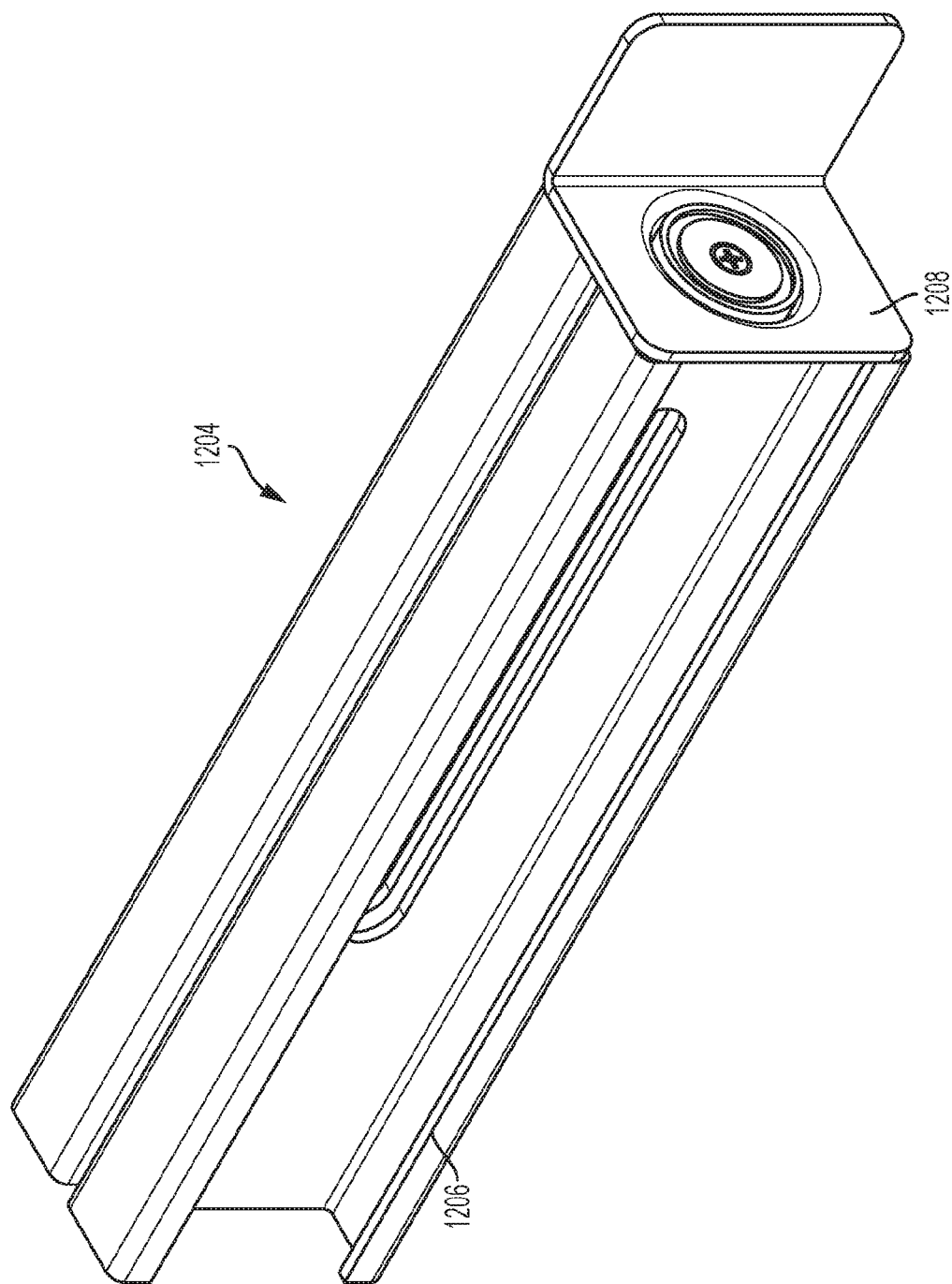

FIGS. 13A-13C depict side, top, and isometric views, respectively, of sliding subassembly 1204 in isolation. The sliding subassembly 1204 is comprised of the sub-frame 1206 that receives magnetic clip assembly 1208 and limits the motion inward and outward from adjustable shoring beam 1202. The magnetic clip assembly 1208 is fixed to the sub-frame 1206 by welding, bolting, or using the existing E-Slot or other tracking systems' spring locking mechanism to fasten to a beam. A bolt connection is used in the exemplary drawings.

Figure 14B:
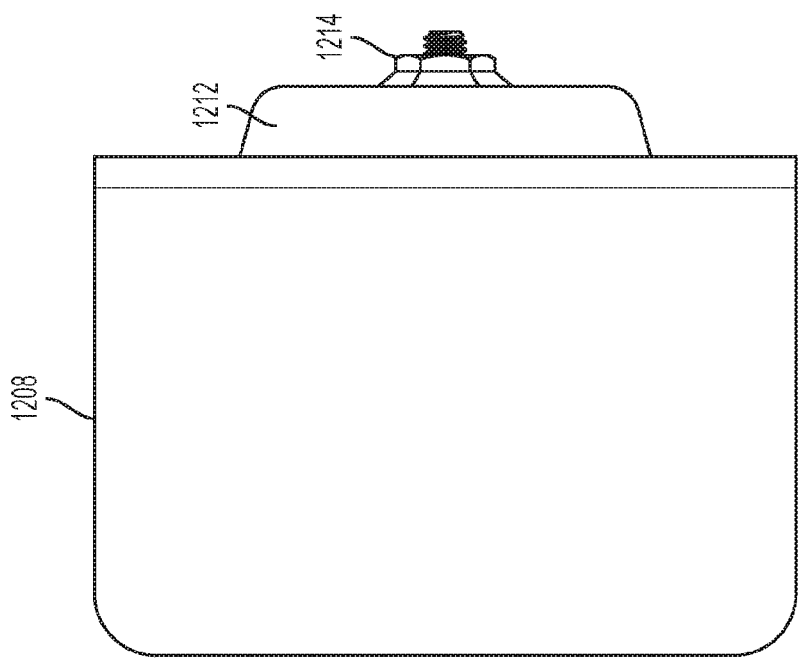
Figure 14A:
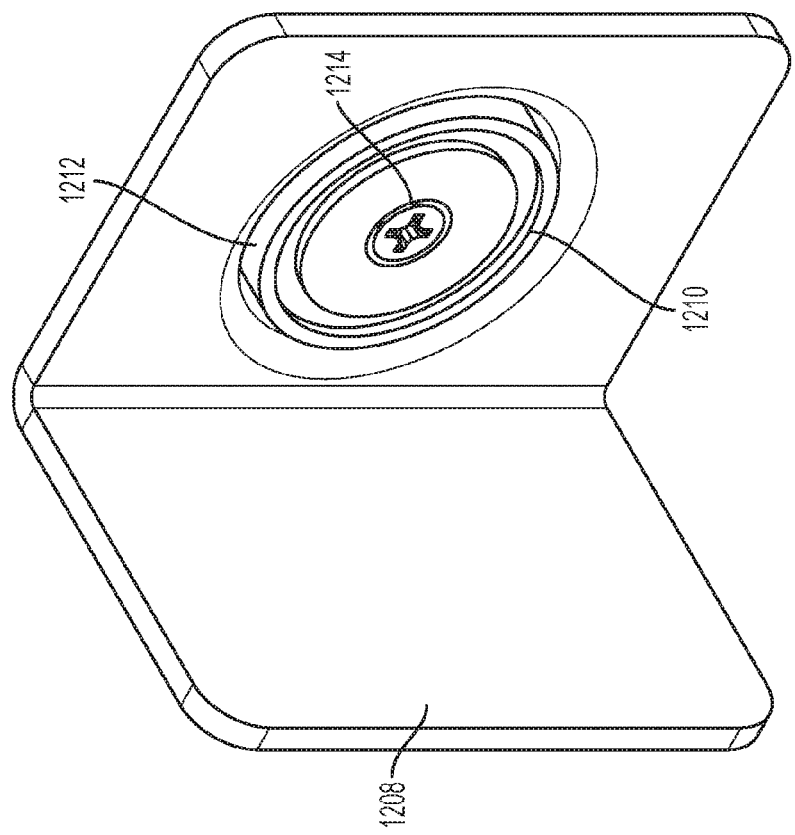

Referring to FIG. 14A, depicted is magnetic clip assembly 1208 in an isometric view to show the "L" shape as well as the magnet 1210 located in recess 1212. Magnet 1210 is fixed to magnetic clip assembly 1208 with bolt 1214. Bolt 1214 allows the ability to remove and install the magnet 1210 after magnetic clip assembly 1208 is welded in place.

As already described, the shoring beam can be inserted into vertical slots 402 or 706. Alternatively, as depicted in FIG. 15, magnet 1210 can also be used to maintain a connection between vertical post 106 and adjustable shoring beam 1202. In this embodiment, the magnetic force of magnet 1210 provides the force to maintain the vertical resting height of the adjustable shoring beam 1202 as well as the force required to maintain the connection between adjustable shoring beam 1202 and vertical post 106, yet maintain the ability to quickly remove adjustable shoring beam 1202 by hand or machine.

Additional Embodiments

Figure 16:
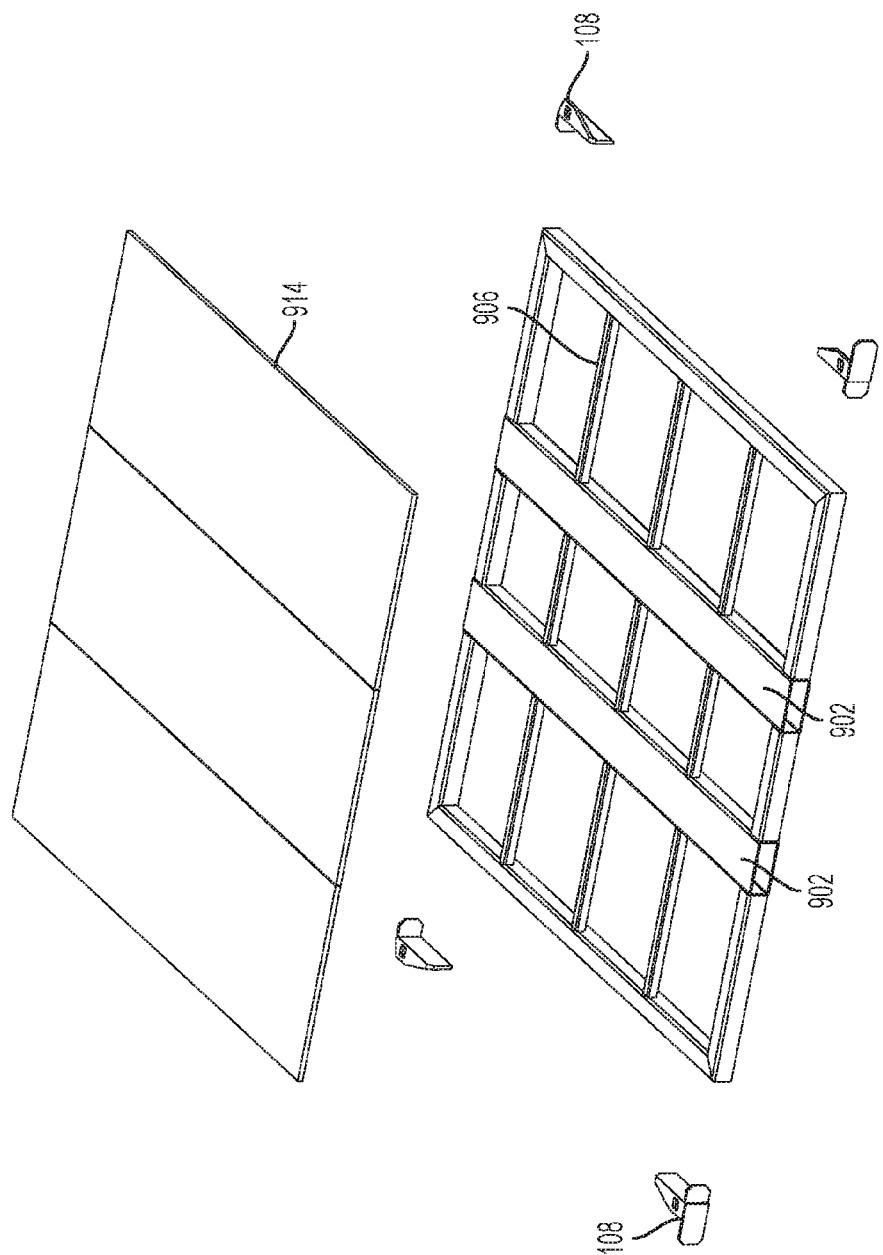
FIG. 16 depicts an exploded view of an alternate embodiment for a deck.
Figure 17B:
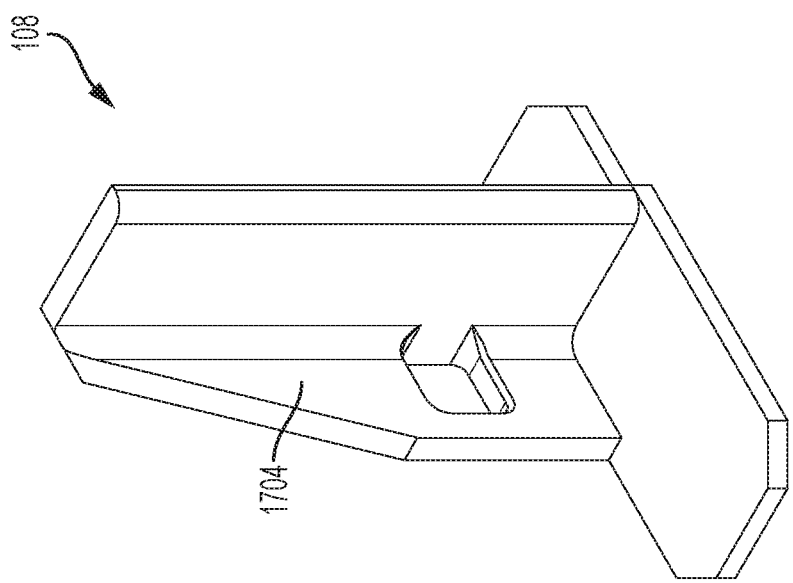
FIGS. 17A-17B depict alternate embodiments of the engagement members.
Figure 17A:
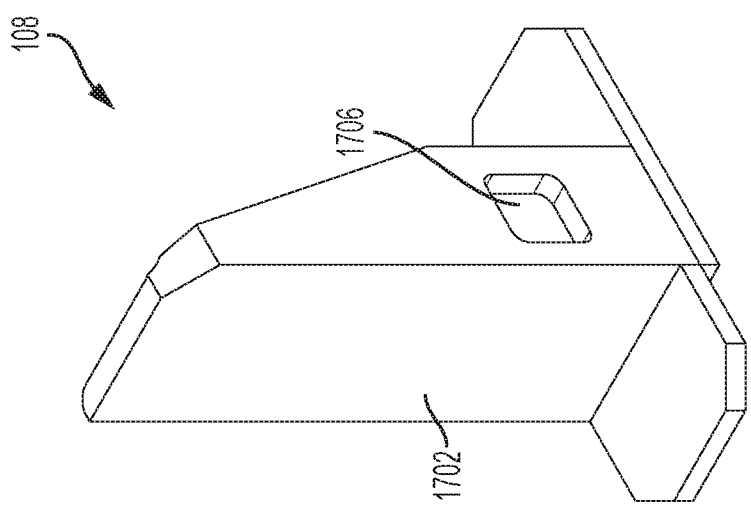

FIG. 16 depicts an alternate embodiment of deck 104 described with reference to FIGS. 16-17B. As depicted, deck 104 comprises two beams 902 joined by a plurality of cross-members 906. In this embodiment, beams 902 do not have rectangular cutouts 910. This leads to a simplified construction because only three pieces of decking 914 are needed to create deck 104. The corner construction is also simplified in that the corners of deck 108 are joined by two cross-members 906 having 45° angled edges.

Deck 104 depicted in FIG. 16 can also be used with different embodiments of engagement member 108 as depicted in FIG. 16. As shown in more detail in FIGS. 17A and 17B, engagement member 108 in this embodiment includes a mounting surface 1702 which is welded or bolted to deck 104 as shown in FIG. 16. Engagement member 108 further includes engagement surface 1704 which has hole 1706. Hole 1706 is sized so that it can receive a pin located on vertical post 106 as will now be described.

Figure 18:
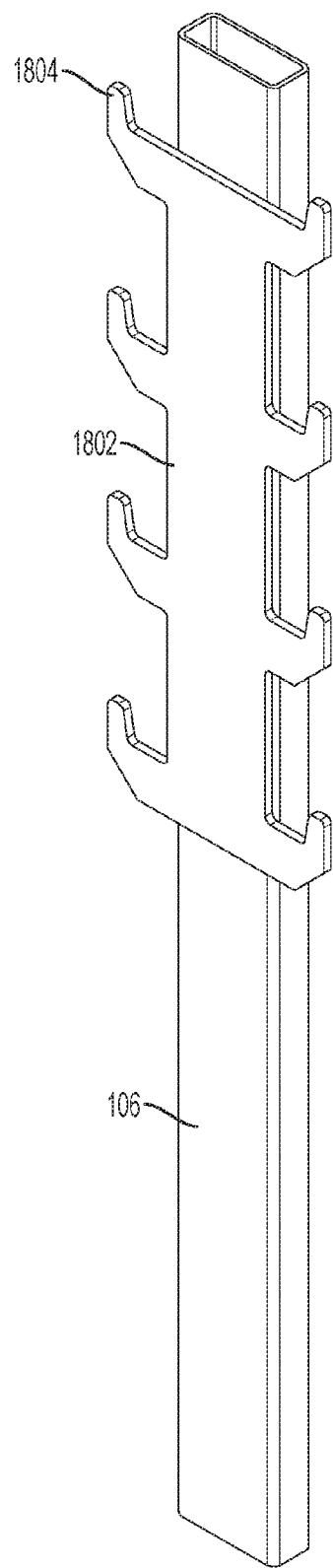
FIG. 18 depicts an alternate view of a vertical post having a hook plate.

FIG. 18 depicts an alternate version of vertical post 106 described in FIGS. 3-4D. In this embodiment, a hook plate 1802 having a plurality of hooks 1804 is welded or bolted to vertical post 106. The hooks 1804 are preferably integrally formed with hook plate 1802 and spaced at equal intervals in pairs. Each hook plate 1802 is preferably the same to reduce manufacturing costs. However, it should be apparent that the number and spacing of the hooks 1804 can be varied.

Hook plate 1802 and hooks 1804 are preferably formed from a metal, such as carbon steel. However, other materials may also be utilized to lower weight and cost of manufacture of hook plate 1802. The size and shape of hooks 1804 may also be varied.

A central rectangular portion of hook plate 1802 is approximately 5" or less in width. This allows hooks 1804 to extend beyond the edge of vertical post 106 when attached. A total length of hook plate 1820 is preferably approximately 30.75". Hooks 1804 are preferably approximately 0.375" in thickness in a preferred embodiment. Hooks 1804 have a chamfered outside bottom corner to lower the likelihood of damaging goods when loading freight onto deck 104 or MP 102.

Each hook plate 1802 has four or more pairs of hooks 1804 which are preferably spaced approximately 10" apart. However, the number and spacing of pairs of hooks 1804 can be varied.

Preferably, a bottom of hook plate 1802 is attached approximately 30.75" from a bottom of vertical post 106 such that hooks 1804 are only located along an upper portion vertical post 106. Hooks 1804 and/or engagement members 108 are not generally needed along the lower portion of vertical post 106 because freight can be directly stacked on MP 102.

The engagement of hooks 1804 with holes 1706 allows a user to place deck 106 at a desired height and location on MP 102 and prevents deck 104 from shifting greatly in position after placement.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A modular deck system comprising:
   a base;
   a plurality of vertical posts coupled to the base;
   a plurality of engagement members,
   wherein at least one engagement member of the plurality of engagement members is coupled to at least one vertical post of the plurality of vertical posts; and
   at least one modular deck comprising:
      a plurality of mating structures coupled to corners of the at least one modular deck, each mating structure configured to releasably mate with the at least one engagement member of the plurality of engagement members on the at least one vertical post,
   wherein the at least one engagement member comprises:
      a hanging member;
      a face plate; and
      and a receiving cup comprising:
         an angled receiving surface; and
         a central receiving hole in a bottom of the angled receiving surface,
         wherein the central receiving hole is configured to receive a portion of a mating structure of the plurality of mating structures.

2. The modular deck system according to claim 1, wherein each mating structure comprises:
   a hanger bracket for coupling the mating structure to a frame of the modular deck;
   an extension member extending perpendicular to a face of the hanger bracket; and
   a pin extending parallel to the face of the hanger bracket.

3. The modular deck system according to claim 2, wherein the pin has a diameter less than a diameter of the central receiving hole.

4. The modular deck system according to claim 3, wherein the pin is approximately 2-3 inches in length with a 30-40° chamfered point extending for 0.2-0.3 inches and terminating in a flat tip.

5. The modular deck system according to claim 4, wherein the angled receiving surface is approximately 2-3 inches in width and 2-4 inches in length.

6. The modular deck system according to claim 1, wherein the receiving cup has a semi-circular bore along a lower portion of the receiving cup extending perpendicular to a plane of the face plate.

7. The modular deck system according to claim 2, wherein the face plate comprises an opening for receiving a first end of a locking pin located within a frame of the modular deck, and
   wherein, in an extended position, the locking pin engages an underside of the circular bore to lock the modular deck to a vertical post.

8. The modular deck system according to claim 7, wherein a second end of the locking pin is located in a groove having an open-end rectangle shape, and
   wherein movement of the second end of the locking pin from a first end of the groove having the open-end rectangle shape to a second end of the groove having the open-end rectangle shape causes the first end of the locking pin to engage the underside of the circular bore.

9. The modular deck system according to claim 1, wherein the modular deck further comprises:
   a frame comprising:
      at least two tubular beams having open ends extending an entire width of the modular deck, and
      a plurality of tubular cross-member beams extending perpendicular to the at least two tubular beams,
   wherein the plurality of tubular cross-member beams are coupled to the at least two tubular beams at cutouts along sides of the at least two tubular beams to form at least two channels extending an entire length of the modular deck.

10. The modular deck system according to claim 1, further comprising:
a plurality of post receiving structures coupled to the base, wherein each vertical post is bolted or welded to a corresponding post receiving structure from the plurality of post receiving structures.

11. The modular deck system according to claim 1, wherein each vertical post comprises:
at least one engagement member receiving structure comprising a receiving hole and a first bolt hole;
wherein the face plate comprises a second bolt hole;
wherein the hanging member further comprises:
a lip and a semi-circular lower portion,
wherein the engagement member is coupled to the vertical post by
a) inserting the lip into the receiving hole;
b) rotating the engagement member so that a front side of the lip contacts an interior of the vertical post and a rear surface of the face plate contacts an exterior of the vertical post; and
c) securing a bolt through the first bolt hole and the second bolt hole.

12. The modular system deck according to claim 10, wherein at least two sides of each vertical post comprises at least one engagement member receiving structure.

13. A modular deck system comprising:
a base;
a plurality of vertical posts coupled to the base;
a plurality of engagement members,
wherein at least one engagement member of the plurality of engagement members is coupled to at least one vertical post of the plurality of vertical posts; and
at least one modular deck comprising:
a plurality of mating structures coupled to corners of the at least one modular deck, each mating structure configured to releasably mate with the at least one engagement member of the plurality of engagement members on the at least one vertical post; and
an extension post slidingly received in at least one vertical post of the plurality of vertical posts,
wherein the extension post can be locked in an extended position and a retracted position,
wherein a side of the extension post comprises at least two locking holes,
a locking mechanism coupled to an exterior of the at least one vertical post configured to engage the at least two locking holes,
wherein the locking mechanism comprises:
a locking member having a button at a first end and a locking button at a second end, wherein the locking button is configured to engage the at least two locking holes; and
a biasing member for securing the locking mechanism and the locking member to an interior of the vertical post; and
a spring located between the button and a spring surface of the biasing member.

14. The modular deck system according to claim 13, wherein at least one corner of the extension post comprises a rail.

15. The modular deck system according to claim 14, wherein the rail comprises a plurality of surfaces, with at least two surfaces of the plurality of surfaces of the rail engaging an interior of the at least one vertical post.

16. The modular deck system of claim 13, wherein pressing the button causes the locking member to rotate about the biasing member to cause the locking button to become disengaged from the locking holes.

17. The modular deck system of claim 13, wherein a lower half of the locking button comprises a 45° beveled edge.

18. A modular deck system comprising:
a base;
a plurality of vertical posts coupled to the base;
a plurality of engagement members,
wherein at least one engagement member of the plurality of engagement members is coupled to at least one vertical post of the plurality of vertical posts; and
at least one modular deck comprising:
a plurality of mating structures coupled to corners of the at least one modular deck, each mating structure configured to releasably mate with the at least one engagement member of the plurality of engagement members on the at least one vertical post,
wherein the plurality of vertical posts each comprises a plurality of vertical slots configured to receive at least one shoring beam; and
wherein the modular deck system further comprises:
at least one magnetic shoring beam comprising:
a central shoring beam portion; and
a sliding subassembly slidable within a track of the central shoring beam portion,
wherein an end of the sliding subassembly terminates with a L-shaped magnetic clip,
wherein a first portion of the L-shaped magnetic clip is configured to be received into a first vertical slot of the plurality of vertical slots, and
wherein a second portion of the L-shaped magnetic clip comprises a flat surface having a coplanar or recessed magnet.

19. The modular deck system according to claim 18, wherein a magnetic force from the magnet causes the first portion to be retained within the first vertical slot.

* * * * *